United States Patent
Knight

(10) Patent No.: US 7,043,619 B1
(45) Date of Patent: May 9, 2006

(54) STORAGE CONFIGURATOR FOR DETERMINING AN OPTIMAL STORAGE CONFIGURATION FOR AN APPLICATION

(75) Inventor: Margaret E. Knight, Seattle, WA (US)

(73) Assignee: VERITAS Operating Corporation, Mountain View, CA (US)

( * ) Notice: Subject to any disclaimer, the term of this patent is extended or adjusted under 35 U.S.C. 154(b) by 225 days.

(21) Appl. No.: 10/327,561

(22) Filed: Dec. 20, 2002

Related U.S. Application Data

(60) Provisional application No. 60/348,870, filed on Jan. 14, 2002.

(51) Int. Cl.
*G06F 12/00* (2006.01)

(52) U.S. Cl. .................. 711/170; 709/220; 709/221

(58) Field of Classification Search ............ 711/114; 707/1, 102
See application file for complete search history.

(56) References Cited

U.S. PATENT DOCUMENTS

| | | | |
|---|---|---|---|
| 6,347,366 B1* | 2/2002 | Cousins ................. | 711/170 |
| 6,519,679 B1* | 2/2003 | Devireddy et al. ....... | 711/114 |
| 6,538,669 B1 | 3/2003 | Lagueux, Jr. et al. | |
| 6,629,158 B1* | 9/2003 | Brant et al. ............. | 710/10 |
| 6,654,797 B1 | 11/2003 | Kamper ................. | 709/220 |
| 6,751,739 B1* | 6/2004 | Verdun .................. | 713/300 |
| 2002/0122543 A1* | 9/2002 | Rowen ................... | 379/93.01 |
| 2002/0129216 A1* | 9/2002 | Collins .................. | 711/170 |
| 2003/0046270 A1* | 3/2003 | Leung et al. .......... | 707/1 |
| 2003/0233518 A1* | 12/2003 | Yamagami et al. ..... | 711/114 |
| 2004/0172412 A1* | 9/2004 | Files et al. ............. | 707/104.1 |
| 2004/0221022 A1* | 11/2004 | Gracyk ................. | 709/220 |
| 2004/0243699 A1* | 12/2004 | Koclanes et al. ....... | 709/224 |

OTHER PUBLICATIONS

U.S. Appl. No. 10/388,193, filed Mar. 2003, Knight, Margaret.*
Tony Redmond, "Managing Mailbox Quotas," Windows IT Pro, Jul. 1998. Accessed online on Jul. 18, 2005 at http://www.windowsitpro.com/MicrosoftExchangeOutlook/Article/ArticleID/4921/4921.html.*
"Performance and Capacity Planning Solutions", © 1999 Compaq Computer Cooperation.

* cited by examiner

*Primary Examiner*—Donald Sparks
*Assistant Examiner*—Jesse Diller
(74) *Attorney, Agent, or Firm*—Meyertons Hood Kivlin Kowert & Goetzel, P.C.

(57) ABSTRACT

A method for automatically (i.e., programmatically) determining a storage configuration for a storage system for a given application. The method may receive information on existing storage capabilities in the storage system and information regarding the software application that will use the storage system. The method may then automatically determine a storage configuration for the storage system based on the existing storage capabilities in the storage system, the information regarding the application, and application specific rules about storage configuration principles of the application. The rule may comprise priority information that specifies a priority in application of the rules, e.g., a structure or list of storage types in order of priority for different application data types.

12 Claims, 39 Drawing Sheets

STORAGE CONFIGURATOR FOR DETERMINING AN OPTIMAL STORAGE CONFIGURATION FOR AN APPLICATION

PRIORITY CLAIM

This application claims benefit of priority of U.S. provisional application Ser. No. 60/348,870 titled "Storage Configurator" filed on Jan. 14, 2002.

BACKGROUND

1. Field of the Invention

This invention relates to automatically determining storage configurations for an application.

2. Description of the Related Art

Network administrators are required to perform many various types of tasks in setting up and running a network. One common task performed by a network administrator is creating a storage configuration, e.g., setting up and configuring storage on a server. Network administrators are required to create storage configurations for various applications, including Microsoft Exchange, SQL databases, etc.

The creation of a storage configuration for an application is a difficult and complicated task. Therefore, it would be greatly desirable to provide an automated process which allows the user to more easily create and apply a storage configuration to one or more computer systems.

SUMMARY OF THE INVENTION

One embodiment of the invention comprises a method for automatically (i.e., programmatically) determining a storage configuration of a storage system, wherein the storage configuration may be determined for a certain application. One embodiment of the invention comprises one or more software programs stored on a memory medium which are executable to determine a storage configuration for the storage system. The one or more software programs may have a software architecture that allows the software programs to be used for a plurality of different types of applications.

The method may first receive information on existing storage capabilities in the storage system. For example, the user may enter information in a graphical user interface (GUI) regarding the existing storage capabilities in the storage system. Alternatively, the method may automatically (i.e., programmatically) determine existing storage capabilities in the storage system.

The method may then receive information regarding the application, e.g., the software application that will use the storage system. For example, the user may enter information in a graphical user interface (GUI) regarding the application. The method may also query the application to obtain information regarding the application. The information regarding the application may comprise information regarding various application objects (e.g., files, databases, etc.) present in the application.

The method may then automatically determine a storage configuration for the storage system based on the existing storage capabilities in the storage system and the information regarding the application. In automatically determining the storage configuration, the method may examine a first data structure (rule data structure) comprising rule information. The rule information may comprise rules about storage configuration principles of the application. The rule information may be application specific. In one embodiment, the rule information comprises priority information that specifies a priority in application of the rules. For example, the rule information may comprise a structure or list of storage types in order of priority for different application data types.

In one embodiment, the method automatically determines the storage configuration by examining available storage in the storage system, determining storage allocations based on the available storage in the storage system and the rule information, and generating the storage configuration based on the storage allocations.

More specifically, one embodiment may operate as follows. The method may automatically determine the storage configuration by first performing pattern matching between the application information and the rule information. This pattern matching may comprise matching the contents of the rule information data structure with the contents of the application information. The method may then create a second data structure (referred to as a "skeleton data structure") comprising storage organization information of the storage configuration based on the results of the pattern matching. The second data structure may comprise information regarding which application objects should be in which storage subsets (e.g., disk groups). The method may further determine groupings of application objects. This grouping information may affect volume sizes to be allocated. The method may then automatically determine a storage configuration using two or more of the first data structure, the second data structure, and the groupings of application objects. The method may determine storage allocations in the storage configuration using an allocation algorithm.

After the storage configuration has been generated, the storage configuration may be stored in memory. The storage configuration may be useable in configuring the storage system. For example, the storage configuration may be applied to configure the storage system according to the storage configuration.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Incorporation by Reference

U.S. provisional application Ser. No. 60/348,870 titled "Storage Configurator" filed on Jan. 14, 2002 is hereby incorporated by reference as though fully and completely set forth herein.

Figure 1:
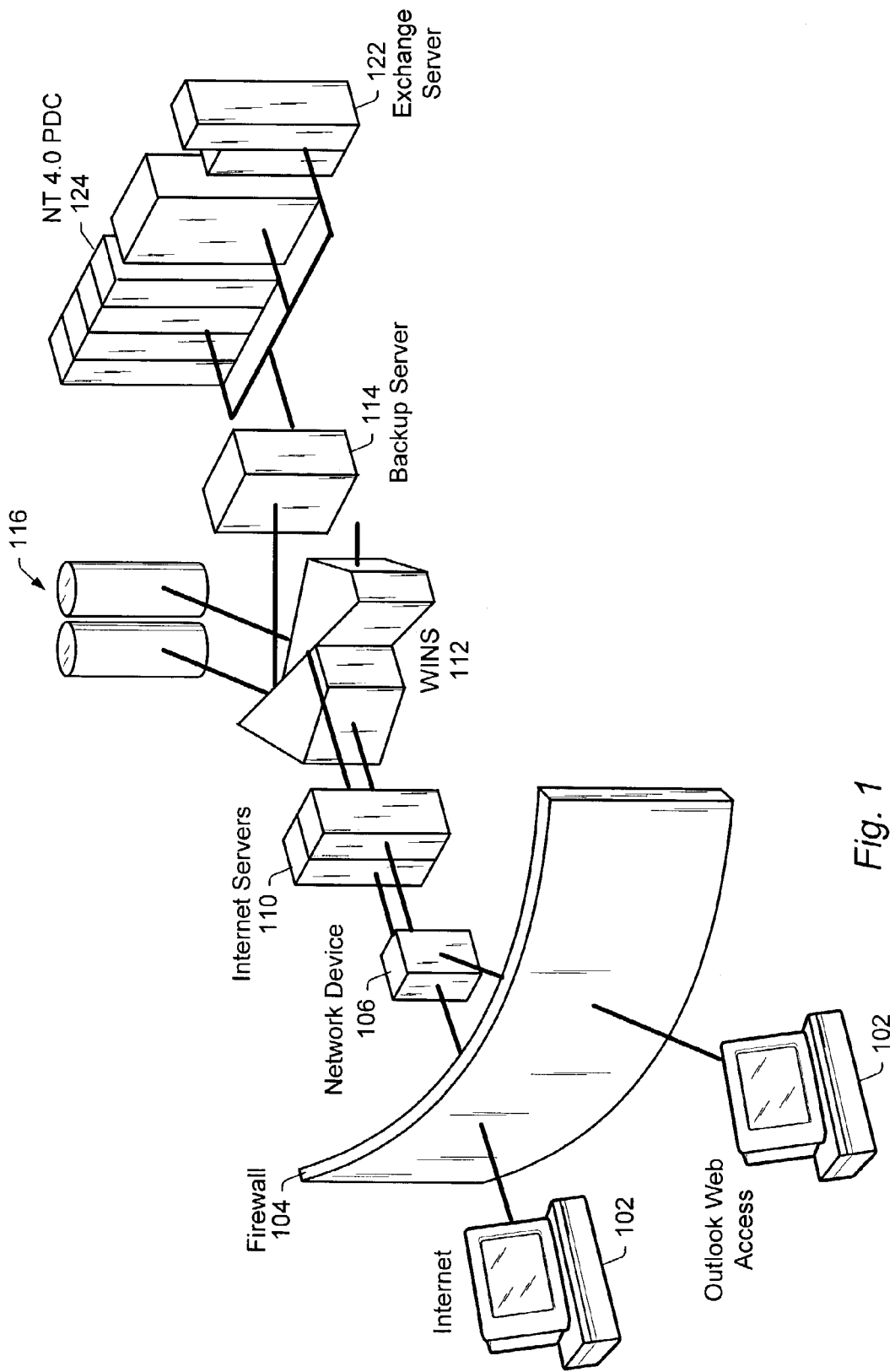
FIG. 1 illustrates an exemplary network system according to one embodiment.

FIG. 1—Exemplary Network System

FIG. 1 illustrates an exemplary network system according to one embodiment. Embodiments of the invention may be used in any of various types of network or enterprise systems, and FIG. 1 illustrates one example of a network system. The network system may be a local area network (LAN), two or more interconnected local area networks, or a wide area network (WAN) comprising two or more distributed LANs coupled together, such as by the Internet, among other possible configurations.

As shown, the network system may include one or more client computer systems 102. The client computer systems 102 may store and/or execute various applications, one example being an electronic mail (email) or electronic contact/scheduling client program, such as Microsoft Outlook. The client computer systems 102 may execute other applications, such as programs for Internet access, database programs, and others. The one or more client computer systems 102 may be connected through a firewall 104 to a network device 106, such as a router, hub, or bridge. The client computer systems 102 may couple through the firewall 104 and/or network device 106 to one or more Internet servers 110. The Internet servers 110 may be connected to various other computer systems and/or storage devices, such as a WINS server 112, a backup server 114, and/or a storage area network (SAN) 116. These servers may in turn be connected to other servers which host other applications, such as Microsoft Exchange server 122 or an NT 4.0 PDC (Primary Domain Controller) 124, among others.

For many network systems, a network administrator or other person may operate to configure storage of one or more computer systems, e.g., one or more server computers, for various applications. For example, a network administrator may be required to configure or create a storage configuration for applications such as Microsoft exchange, SQL databases, and various other applications. As noted above, current prior art solutions require the network administrator to manually create a storage configuration. However, creation of a storage configuration is a complicated and difficult task and typically requires significant expertise on the part of the network administrator.

One embodiment of the present invention comprises a software program executable on a computer system which operates to programmatically or automatically determine a storage configuration (also called a "storage layout" or simply "layout") for a storage system (or network system) for a given application. As used herein, the term "storage system" includes any of various types of systems which provide storage capabilities, including, but not limited to, a server computer (e.g., having one or more RAID arrays), two or more coupled server computers, a storage area network (SAN), and other types of storage or memory systems.

The method may operate to determine a layout that is optimal based on the application requirements and storage system capabilities. It is noted that the term "optimal" used herein simply means "very good" according to some metric. Embodiments of the present invention operate to greatly simplify the task of the network administrator in determining and creating storage configurations or storage layouts for a network system.

In various embodiments, the Storage Configurator software program may be stored in various locations, such as on a memory medium of one of the client computer systems 102, or a memory medium of one of the server computers. The Storage Configurator software program may also execute on any of various of the computer systems. In one embodiment, the Storage Configurator software program may be stored in a client computer system 102 used by the network administrator for system configuration and management.

The term "memory medium" is intended to include any of various types of memory devices for storing programs and/or data. For example, the term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The software programs which implement embodiments of the present invention may be stored in a memory medium of one of the computers shown in FIG. 1, or in a memory medium of another computer, and executed by one or more CPUs. One or more CPUs executing code and data from a memory medium thus may comprise a means for performing the methods described herein. For example, a CPU executing code and data from a memory medium may comprise a means for automatically determining a storage configuration according to the methods described herein.

Various embodiments may further include receiving, sending or storing instructions and/or data that implement a storage configurator in accordance with the foregoing description upon a carrier medium. Generally speaking, a carrier medium may include a memory medium as defined above, as well as transmission media or signals such as electrical, electromagnetic, or digital signals, conveyed via a communication medium such as network and/or a wireless link.

In general, the term computer system as used herein is defined to encompass any device having a processor which executes instructions from a memory medium. In different embodiments, a "computer system" may take various forms, including a personal computer system, desktop computer, mainframe computer system, server computer system, another suitable device, or combinations thereof. A computer system may be attached to a network as part of a distributed computing environment.

Figure 2:
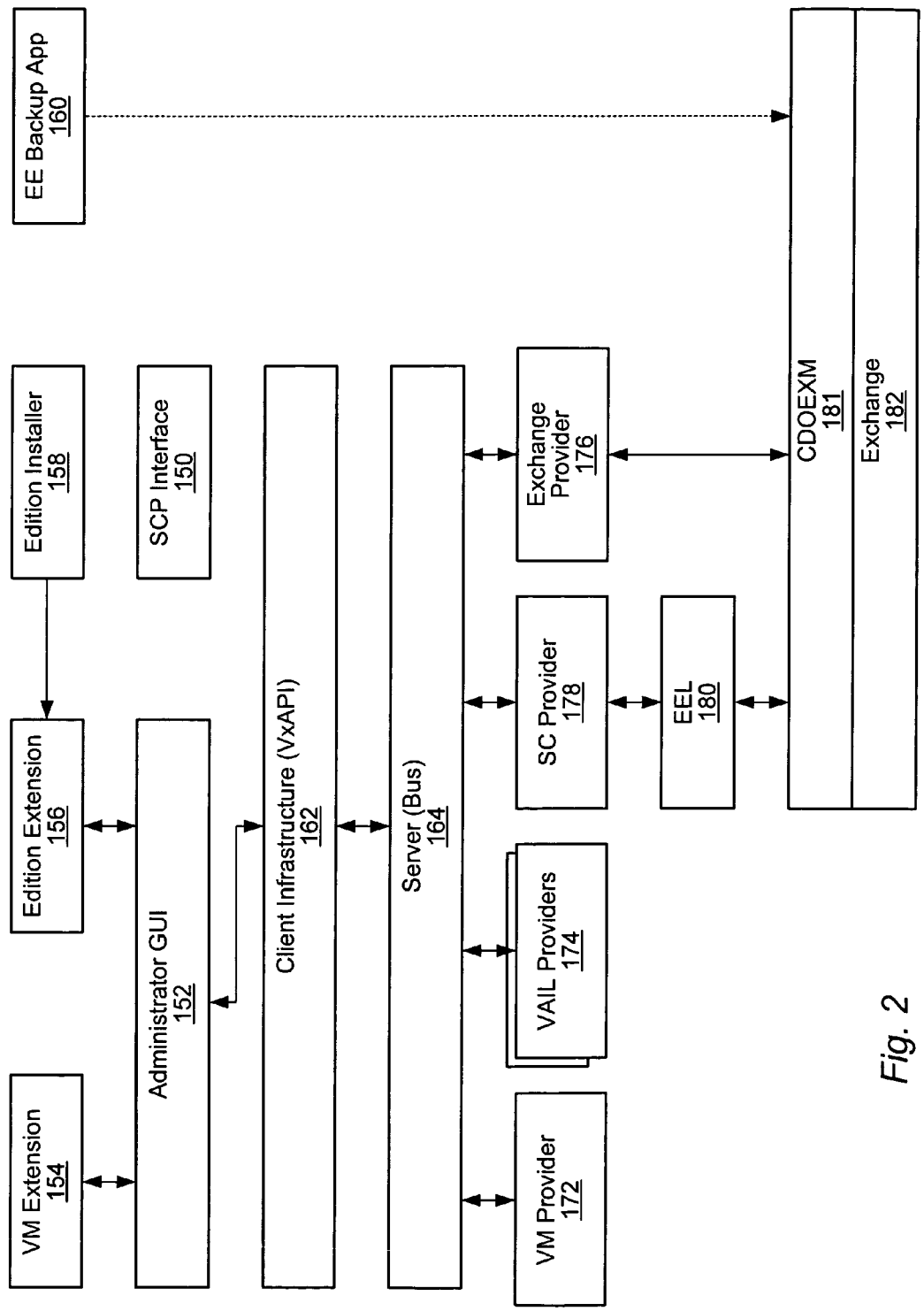
FIG. 2 is a block diagram illustrating a software architecture of one embodiment of the invention.

FIG. 2—Configuration Software Architecture

FIG. 2 illustrates a software architecture of exemplary network configuration software according to one embodiment. The network configuration software may execute on a client computer system 102 used by a network administrator. The network configuration software may provide a management console to the network administrator for performing various network configuration and/or management functions. In one embodiment, the network configuration software shown in FIG. 2 includes one or more software programs (referred to collectively as the "Storage Configuration" program) for automatically determining storage configurations or storage layouts for computers in the system. The network configuration software shown in FIG. 2 may also include software for automatically applying a determined storage configuration to one or more computers in the system. In the currently preferred embodiment, the network configuration software of FIG. 2 is offered by VERITAS Software Corporation (VERITAS Software).

As shown, the software architecture in FIG. 2 may include an Administrator GUI or console 152. The Administrator GUI 152 may support various extensions, such as a VM (Volume Manager) Extension 154 and an Edition Extension 156. The VM Extension 154 provides a console for volume management for non-volatile storage, e.g., disk drives. The Edition Extension 156 provides the user interface for various Edition functionality, such as the Storage Configurator. An Edition Installer 158 may be provided for installing the Edition Extension 156. An Edition Extension (EE) Backup application 160 may also be provided for backing up the application's data. A SCP Interface 150 may also be provided for providing external access to Storage Configurator Provider 178.

The Administrator GUI 152 may interface to a Client Infrastructure layer 162. The Client Infrastructure layer 162 may in turn interface to a Server (Bus) program layer 164. The Server (Bus) program layer 164 may abstract various communication functions among various distributed software programs executing in the network system. As shown, the Server (Bus) program layer 164 may interface to various programs, such as VM (Volume Manager) Provider 172, VAIL (Veritas Array Integration Layer) Providers 174, and an Exchange Provider 176. The VM provider 172 provides volume management for non-volatile storage, e.g., disk drives. The VAIL Providers 174 provide management services for RAID arrays. The Exchange Provider 176 provides management services for Microsoft Exchange.

The Administrator GUI 152 may also interface to a SC (Storage Configurator) Provider 178. The SC Provider 178 may include at least a portion of the Storage Configuration software of one embodiment of the invention. The SC Provider 178 may interface to an application specific layer 180 used in automatically determining a storage configuration for a specific application 182. The application specific layer 180 may in turn interface to a specific application 182. The application specific layer 180 preferably includes functionality that is specific to the application 182 to which the layer 180 corresponds.

In the embodiment shown, the application 182 is Microsoft Exchange, and the application specific layer 180 is the Exchange Edition Layer (EEL). Due to COM interface requirements of Microsoft Exchange, the EEL 180 interfaces to Microsoft Exchange through a COM object layer referred to as CDOEXM (Collaborative Data Object Exchange Management Layer) 181. The CDO Exchange Management Layer 181 is an administrative layer that uses the Collaborative Data Object API from Microsoft to obtain information and configure Microsoft Exchange.

In one embodiment, the SC Provider 178 includes core functionality that is common or generic to any application, and each application specific layer 180 includes application specific functionality for its specific application. This architecture enables modular reuse of the SC Provider 178 for different applications. This architecture obviates the need for a developer to write a new optimization engine for each application in which a storage configurator is desired. Thus the SC Provider 178 operates to abstract the general storage layout optimization algorithms from the application specific rules which are contained in the application specific layer 180.

Figure 3:
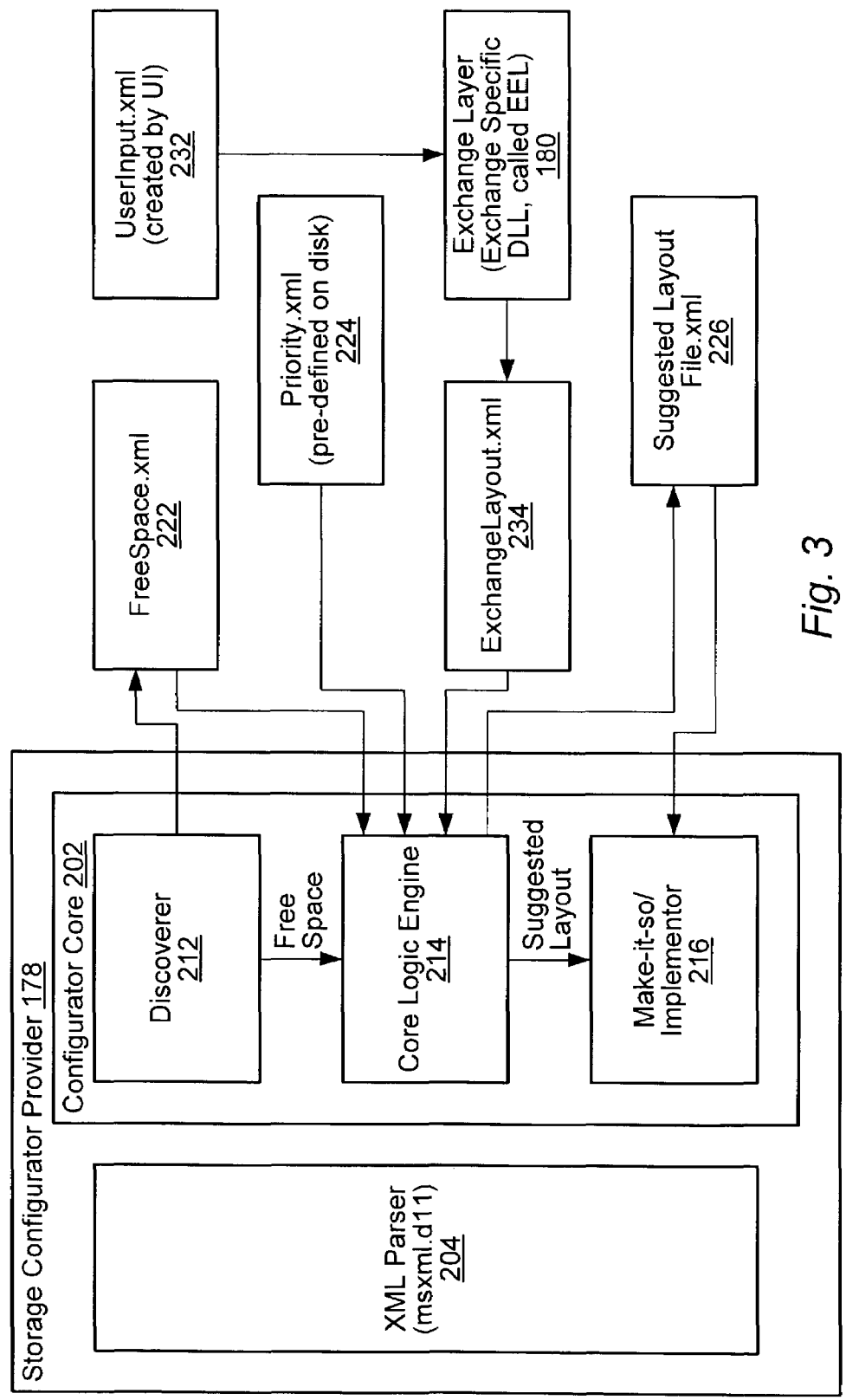
FIG. 3 is a block diagram illustrating the Storage Configurator Provider of FIG. 2 and related files.

FIG. 3—Storage Configurator Software Architecture

FIG. 3 illustrates a software architecture of the Storage Configurator software according to one embodiment of the invention. As shown, the Storage Configurator software includes a Storage Configurator Provider 178 and various other files. The Storage Configurator provider 178 includes a Configurator Core 202 and an XML parser 204. The XML parser 204 performs XML parsing functions. The Configurator Core 202 performs various operations to obtain the information used in determining an "optimal" storage layout for the system.

The Storage Configurator software also includes a FreeSpace.xml file 222, a Priority.xml file 224, and a Layout.xml file 234.

The FreeSpace.xml file 222 contains information about the available free space in the storage system (or network system). In one embodiment, the FreeSpace.xml file 222 contains information about all of the free space in the system. The FreeSpace.xml file 222 is created by a Discoverer component 212, as discussed below.

The Priority.xml file 224 may also be referred to as a "rule information" data structure or "rule data structure". The Priority.xml file 224 comprises rule information used in determining the storage configuration. The rule information may comprise rules about storage configuration principles of the application. The rule information may also comprise priority information, wherein the priority information specifies a priority in application of rules in the rule information. In one embodiment, the rule information comprises storage types in order of priority for different application data types. The Priority.xml file 224 (or rule information data structure) may specify relative preferences for each type of storage to each type of application data type or volume. The priority.xml document thus stores the priority or rule information for the layout determination. In a Microsoft Exchange example, the Priority.xml file 224 specifies relative preferences for each type of storage to each type of Exchange volume. In one embodiment, the Priority.xml file 224 is not modifiable by the user. In another embodiment, the Priority.xml file 224 is modifiable by the user. In another embodiment, a plurality of Priority.xml files 224 are maintained in the system, and the user may select a preferred Priority.xml file 224. Alternatively, the type of application for which storage configuration is being determined may specify one of (or a subset of) the plurality of Priority.xml files 224.

An exemplary rule data structure (priority.xml file) is listed below:

- Each Storage Group results in its own Disk Group
- Each class of user results in its own Database
- Transaction Logs kept on separate set of spindles
- All STM files within Storage Group can be grouped together
- All EDB files within Storage Group can be grouped together
- Last resort: Put STM and EDB files from same Storage Group together
- Suggested STM file size=# users*mailbox size
- Suggested EDB file size=# users*mailbox size
- Additional rules about hot spares, RAID-5 logging, FMR logs, etc.

The user of the storage configurator provider 178 may provide input about the target application, including various information regarding how the application will be used. In one embodiment, the storage configuration software includes a graphical user interface (GUI) or wizard that guides the user in entering this input. The UserInput.xml file 232 may be created by user input supplied by the user to a console wizard or user interface program.

The user input (UserInput.xml file) 232 is received by the Application Specific Layer 180, in this example the Exchange Layer or EEL. The Application Specific Layer 180 contains knowledge about the specifics of its respective application. In a current example where the application is Microsoft Exchange, the EEL 180 contains knowledge of the specifics of Microsoft Exchange and operates to create a logical exchange storage configuration based on inputs from the user. The logical exchange storage configuration may contain the name and size of each exchange object requiring storage. The Application Specific Layer 180 generates the Layout.xml document 234. In this example, where the application is Microsoft Exchange, and the Layer 180 is the EEL, the document is referred to as Exchange Layout.xml 234.

The EEL decides how much space to allocate each file. The EEL receives a user input data structure from the GUI and converts this information into the application information. The EEL includes various application specific rules.

As one example for Microsoft Exchange, the EEL may comprise the following rules:

- Possibly split databases if they are too big;
- Number of parallel backups used as minimum for number of Storage Groups
- If content indexing turned on, add 20% to above numbers
- Transaction Log size=(Total size of all databases within Storage Group*0.20)+100 MB
- Memory constraints:
    - RAM >=(130 MB*SGCount)+((DBCount−SGCount) *25 MB)+126 MB
    - If total mailboxes<500, RAM >=256 MB
    - If 500<=total mailboxes<1000,RAM>=512 MB
    - If 1000<=total mailboxes<2500,RAM>=1 GB
    - If total mailboxes >=2500, RAM>=2 GB The Configurator Core 202 includes a Discoverer 212, a Core Logic engine 214, and an Implementer 216.

The Discoverer 212 operates to automatically detect existing storage in the network system. The Discoverer 212 generates the FreeSpace.xml file 222, described above. The FreeSpace.xml document 222 describes the free space or available storage in the storage system.

The FreeSpace.xml document 222 is available to the Core Logic engine 214. The Core Logic engine 214 receives the free space information from FreeSpace.xml 222. As noted above, the Storage Configurator software also includes a priority document referred to as Priority.xml 224. The optimization algorithm(s) in the Core Logic Engine 214 analyze the priority or rule information in Priority.xml 224 in determining how to optimize usage of the discovered free space or available storage space in the system.

The Core Logic Engine 214 analyzes the available free space in the FreeSpace.xml document 222, analyzes the user input embodied in the Layout.xml document 234, and examines the priority or rules contained in the Priority.xml document 224, and operates to generate a suggested layout or suggested storage configuration for the existing storage. The suggested layout is embodied in a document called SuggestedLayoutFile.xml 226. The Core Logic Engine 214 preferably forms the core of the storage configurator. The Core Logic Engine 214 may utilize a policy whereby the volume size is equal to the sum of the sizes of all files to be placed on the volume.

The Implementer 216 receives the SuggestedLayoutFile.xml 226 and operates to implement the suggested layout. In other words, the Implementer 216 analyzes the information in SuggestedLayoutFile.xml 226 and configures the various network resources (including non-volatile memory or disks) according to the layout information, optionally in response to user input or approval of the suggested layout.

Therefore, in determining a (preferably optimal) storage configuration according to one embodiment, the Core Logic Engine 214 utilizes user input received from the user, such as through a console wizard or GUI; the amount of available storage or free space (or memory, e.g., non-volatile memory and/or RAM) present in the storage system (e.g., one or more servers); and the Priority.xml file.

Figure 4:
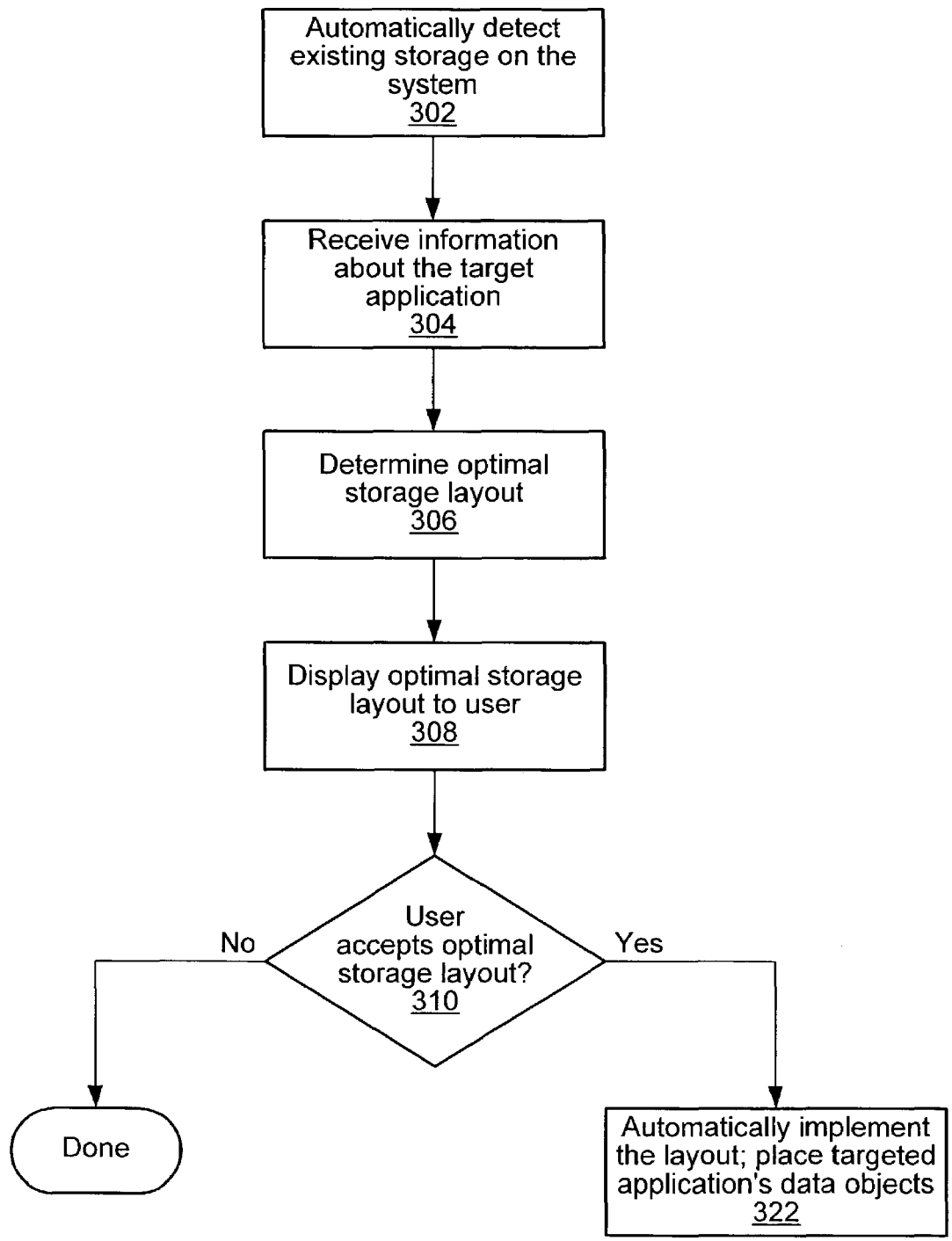
FIG. 4 is a flowchart diagram illustrating one embodiment of the invention.

FIG. 4—Flowchart Diagram

FIG. 4 is a flowchart diagram illustrating one embodiment of a method of operation of the storage configurator software according to one embodiment of the invention.

In 302 the method may first receive information on existing storage capabilities in the storage system. For example, the user may enter information in a graphical user interface (GUI) regarding the existing storage capabilities in the storage system. Alternatively, the method may automatically (i.e., programmatically) determine or detect existing storage capabilities in the storage system. Step 302 may be performed by the Discoverer program 212 of FIG. 3. In an alternate embodiment, the user may manually provide at least a portion of this information regarding the available or existing storage in the system. A flowchart diagram illustrating operation of the Discoverer 212 is provided in FIG. 6.

In 304 the method may then receive information regarding the target application. For example, the user may enter information in a graphical user interface (GUI) regarding the application. The application layer 180 of the storage configurator may also, or instead, query the application to obtain information regarding the application. The information regarding the application may comprise information regarding various application objects (e.g., files, databases, etc.) present in the application. As noted above, the storage configurator software program may present a graphical user interface, such as a GUI of a console wizard, to the user. The user may then input values which will be used to aid in determining the optimal storage layout. Table 1 below describes exemplary questions that may be presented by the GUI in 304.

TABLE 1

| Question | Influences |
| --- | --- |
| Content Indexing | Size of the volume increases |
| Number of groups of users (classes of users) | Total number of Mailbox Databases |
| Number of users in group * size of each mailbox | Size of each Database |
| Maximum size of Backup | Maximum size of Database |
| Number of parallel Backups | Minimum number of Storage Groups |
| Which LUNs to include | Maximum number and size of Databases we can configure (and where to put databases and transaction logs). Also influences which empty volumes can be included. |
| Which Volumes to include | Where we can configure databases and transaction logs. Any included volumes which are used will be deleted and their space will be reallocated. |

Alternatively, information regarding the application may be obtained from a previously created data structure. For example, the user (or another user) may have previously created an application data structure that contains the application information. In another embodiment, application program vendors may provide such an application data structure with their applications.

In 306 the method may automatically determine a storage configuration (or storage layout) for the storage system based on the existing storage capabilities in the storage system and the information regarding the application. In automatically determining the storage configuration, the method may examine a first data structure (called the "rule data structure" or "priority.xml") comprising rule information. The rule information may comprise rules about storage configuration principles of the application. In one embodiment, the rule information comprises priority information that specifies a priority in application of the rules. For example, the rule information may comprise a structure or list of storage types in order of priority for different application data types.

In one embodiment, the method automatically determines the storage configuration by examining available storage in the storage system, determining storage allocations based on the available storage in the storage system and the rule information, and generating the storage configuration based on the storage allocations.

More specifically, one embodiment may operate as follows. The method may automatically determine the storage configuration by first performing pattern matching between the application information and the rule information. This pattern matching may comprise matching the contents of the rule information data structure with the contents of the application information. The method may then create a second data structure ("skeleton" data structure) comprising storage organization information of the storage configuration based on the results of the pattern matching. The second data structure may comprise information regarding which application objects should be in which storage subsets (e.g., disk groups). The method may further determine groupings of application objects. The method may then automatically determine a storage configuration using two or more of the first data structure, the second data structure, and the groupings of application objects.

The method may operate to determine the optimal storage configuration (or storage layout) based on the existing storage in the system determined in 302, the information received from the user in 304, and the priority.xml document referred to above. In one embodiment, step 306 is performed by the core logic engine 214 described in FIG. 3.

In step 306 the operation of determining a storage layout is performed automatically. In the present application the term "automatically" refers to a function that is performed programmatically, i.e., the function is performed primarily by software executing on a computer system. Thus, the user is not manually required to determine the storage layout. Rather, based on some simple user input and other information, in step 306 the storage configurator program applies an allocation algorithm (e.g., various optimization rules) to automatically or programmatically determine the optimal storage layout based on this information. This greatly simplifies the operations required to be performed by a network administrator.

In 308 the method may optionally operate to display the determined storage configuration to the user. The display may also include a graphical user interface element, such as a dialog box or other element where the user may graphically chose to accept or decline the determined optimal storage layout.

As shown in the flowchart of FIG. 4, if the user does not accept the determined optimal storage layout, then operation of the method completes. In this case, the user may then repeat the method above or may chose to manually configure a storage layout. If the user accepts the optimal storage layout in step 310 then in step 312 the implementer software 216 may operate to automatically or programmatically implement the layout. This may include placing the target application's data objects.

In one embodiment, the method may simply store the determined storage configuration in memory, possibly without displaying the determined storage configuration. In yet another embodiment, the method may automatically apply the determined storage configuration, again possibly without displaying the determined storage configuration or receiving any acceptance from the user.

Figure 5:
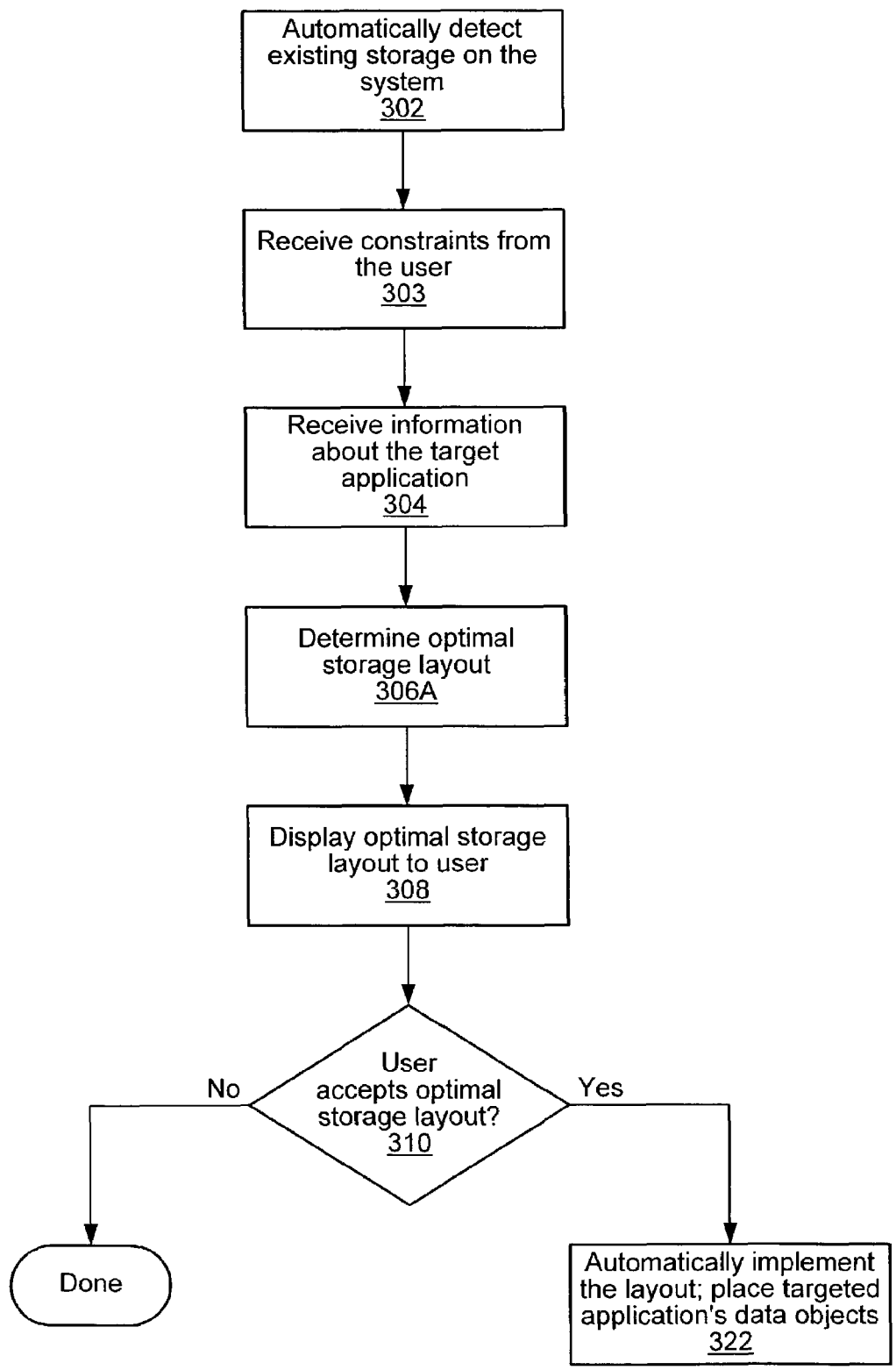
FIG. 5 is a flowchart diagram illustrating an embodiment of the invention where the user may provide constraints to the system.

FIG. 5—Alternate Embodiment

FIG. 5 illustrates an alternate embodiment of the method described in the flowchart of FIG. 4. In the flowchart of FIG. 5, in step 303 the user may also choose to specify one or more constraints on the storage configuration or storage layout prior to the optimal storage configuration being determined in step 306. These constraints are received by the core logic engine 214 and are used in step 306A to determine the (preferably optimal) storage layout. In other words, in step 306A, the optimal storage layout is determined based on information described above (including the available amount of storage or free space, user input regarding the target application, and the priority.xml document) and is also determined based on the constraints specified by the user. Thus, the determined optimal storage layout produced in step 306 will be determined based on an accounting for the constraints identified by the user. This provides a mechanism for the user to specify constraints on priority and to have a storage layout automatically determined taking these constraints into account.

In each of the embodiments of FIGS. 4 and 5, the user may choose to specify some of the input provided to steps 306 and/or 306A and repeat the above process to generate new optimal storage layouts based on this new information. For example, the user may reinvoke the wizard GUI and provide new information about the target application in step 304, and then rerun step 306 to determine a new optimal storage layout based on the new information provided by the user in step 304. As another example, if the user adds more storage to the system, the user may repeat the above method, whereby the optimal storage layout determined in step 306 may differ due to the fact that a greater or lesser amount of storage was added to and/or removed from the system in 302. As yet another example, the user may select a new priority.xml document, or modify an existing priority.xml document, and rerun the method of FIG. 4 to determine a new optimal storage layout based on this newer modified priority.xml document. In some embodiments, the storage configurator program may be automatically re-invoked in response to certain events, such as the addition or removal of storage devices from the storage system.

Modification of Optimal Storage Layout

The optimal storage layout displayed in step 306 may be displayed in any of various ways. In one embodiment, the optimal storage layout is displayed as a tree structure. In another embodiment, the optimal storage layout may be shown iconically in a diagram. For example, a storage configuration diagram may be displayed which includes icons for each of the storage units, e.g., server units, SANs etc. and the optimal storage layout may be graphically and/or iconically depicted in this storage configuration diagram. Regardless of the manner in which the optimal storage layout is displayed to the user, in one embodiment the user may graphically manipulate the displayed storage layout to make modifications to the storage layout. Thus, if the optimal storage layout is displayed as a tree structure in step 306, the user may optionally provide the ability to manually adjust different aspects of the tree structure or different values associated with the tree structure to change the storage layout. For example, the user may make changes and then hit "apply" to apply these changes. If the optimal storage layout is displayed graphically or iconically, the user may use various drag and drop techniques or other graphical editing techniques to change the optimal storage layout as desired. In another embodiment, the optimal storage layout determined by the storage configurator 178 is not modifiable by the user.

Figure 6:
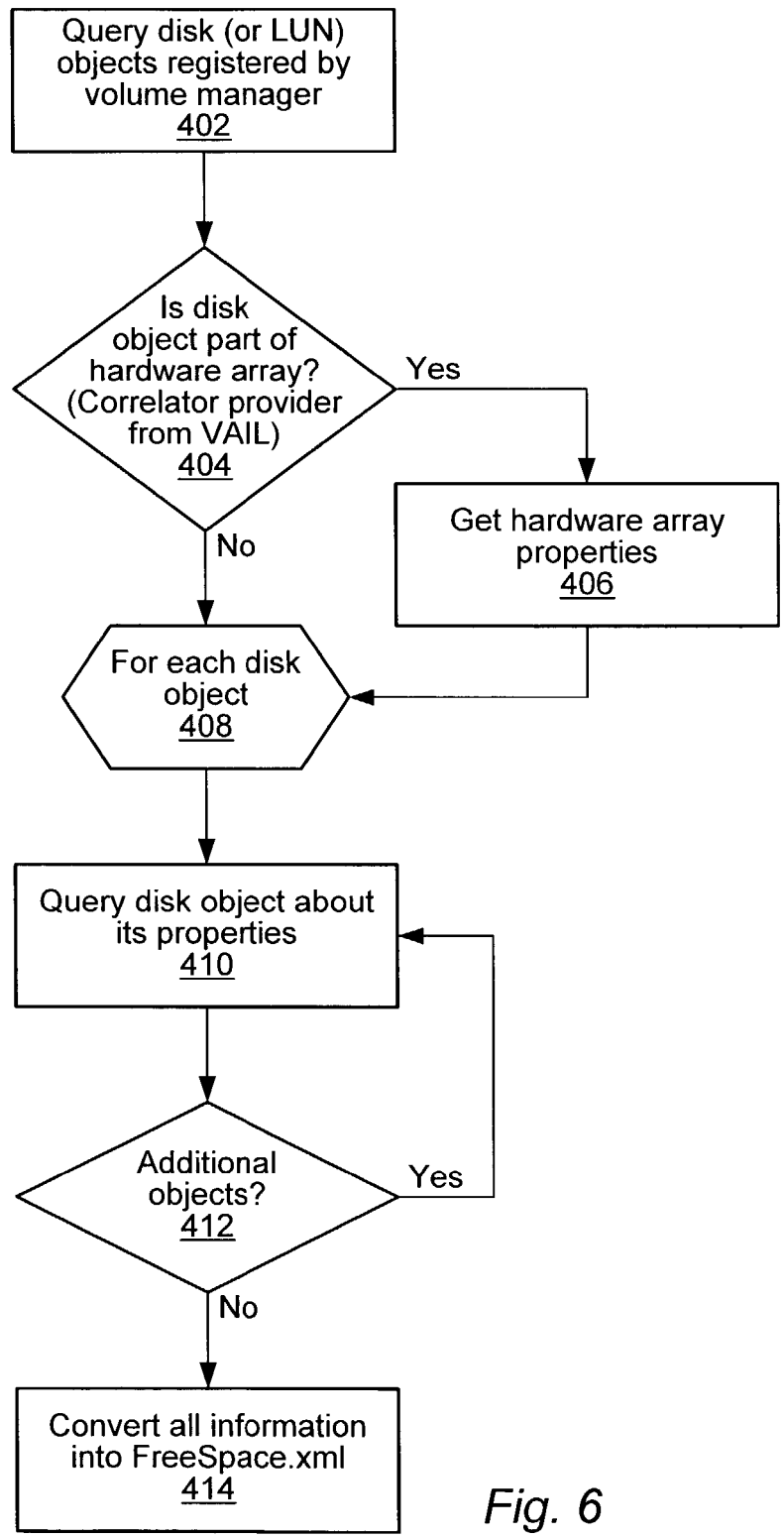
FIG. 6 is a flowchart diagram illustrating automatically detecting existing storage in the system according to one embodiment.

FIG. 6—Discoverer Operation

FIG. 6 is a flowchart diagram illustrating operation of the discoverer component 212 in the storage configurator provider 178. The flowchart diagram of FIG. 6 also illustrates operation of step 302 of FIGS. 4 and 5.

As shown, in 402 the method queries the disk objects registered by the volume manager. This operates to determine what disk objects are present in the system.

In 404 the method determines if each disk object determined in 402 is part of a hardware array. A portion of this operation may be performed by VAIL Provider 174. If a disk object is determined to be part of a hardware array in step 404, then in 406 the method obtains the disk object's respective hardware array properties. Operation then advances to step 408. If a respective disk object is determined to not be part of a hardware array in step 404, then operation proceeds directly to 408.

As shown, in 410 and 412 the method queries each of the disk objects about its properties. The property information for the disk objects is then converted into a FreeSpace.xml document in step 414. The FreeSpace.xml document contains information about free space in the system, preferably all free space available to the application within the system.

Figure 7:
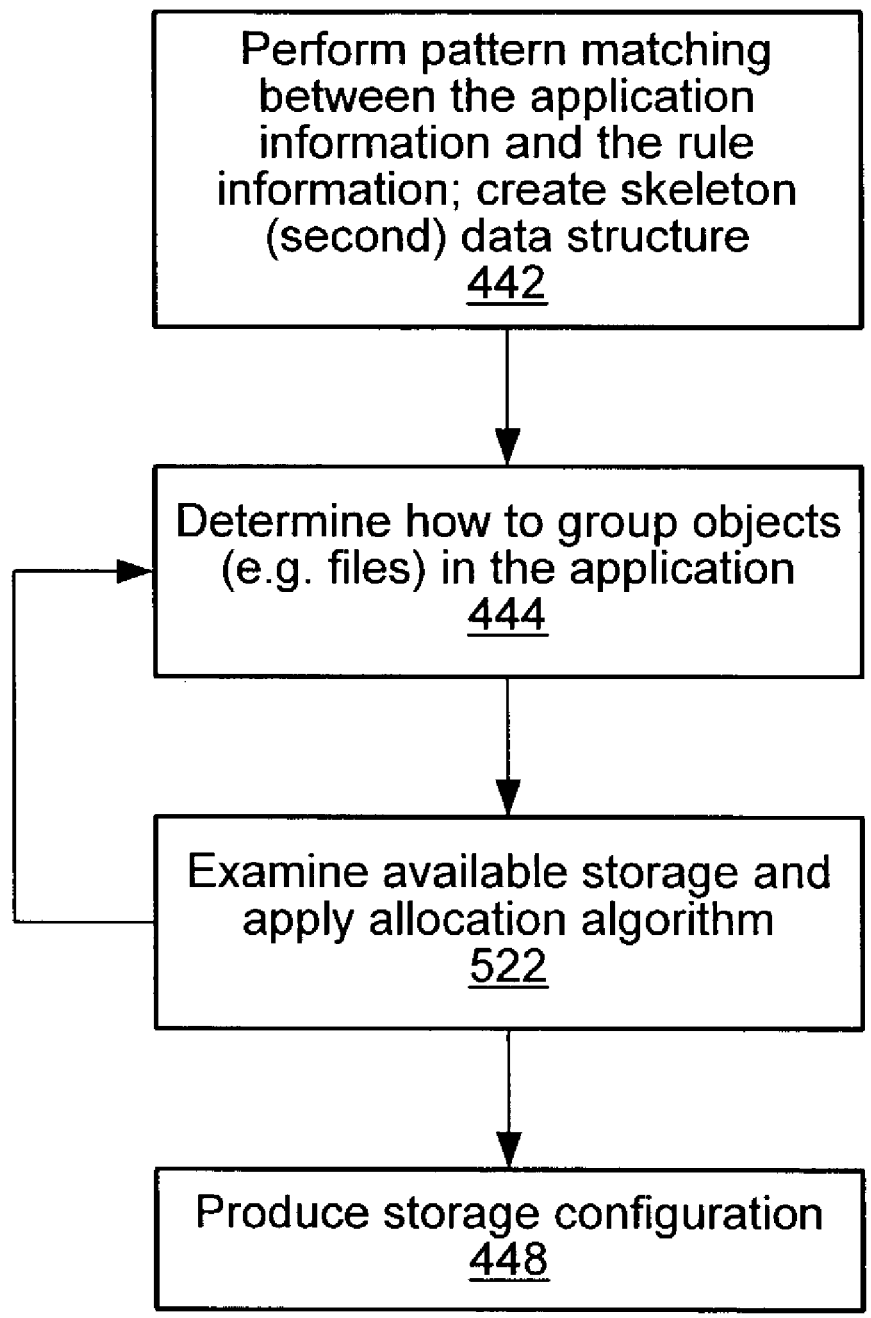
FIG. 7 is a flowchart diagram illustrating automatically determining a storage configuration according to one embodiment.

FIG. 7—Automatically Determining a Storage Configuration

FIG. 7 is a flowchart diagram illustrating automatically determining a storage configuration according to one embodiment. FIG. 7 provides more detail regarding steps 306 and 306A of FIGS. 4 and 5, respectively.

In 442 the method may first perform pattern matching between the application information and the rule information. This pattern matching may comprise matching the contents of the rule information data structure with the contents of the application information. The method may then create a second data structure (also called the "skeleton" data structure and the "NewTree" data structure) comprising storage organization information of the storage configuration based on the results of the pattern matching. The second data structure may comprise information regarding which application objects should be in which storage subsets (e.g., disk groups). The second data structure may be an intermediate form of the SuggestedLayout data structure comprising storage organization information. In one embodiment, each of the rule information data structure (priority.xml) 224 and the application information 234 may comprise text files. The method may perform pattern matching or textual analysis between these two text files to determine a matching or correspondence between data in each of the two text files.

In 444 the method may further determine groupings of application objects. This grouping information may affect volume sizes to be allocated. The method may determine respective groupings of application objects in 444, and then in 522 the method may examine the available storage and apply an allocation algorithm based on the grouping. Steps 444 and 522 may be performed two or more times in a repetitive or iterative fashion, as shown. In other words, the method may determine a first grouping of application objects and apply the allocation algorithm to this first grouping, and then determine a second grouping of application objects and apply the allocation algorithm, and so on, until the optimal (or an acceptable) storage configuration is produced. Steps 444 and 522 are described further with respect to steps 504–512 and 522A–E of FIG. 8. The allocation algorithm may be either a "top down" or "bottom up" greedy (or pseudo-greedy) algorithm with backtracking. The results of these steps may produce a storage configuration. Thus, in one embodiment, the storage configuration may be automatically determined using at least a subset of the above information, e.g., two or more of the first data structure (rule data structure), the second or skeleton data structure, and the groupings of application objects.

After the storage configuration has been determined or generated, in 448 the storage configuration may be stored in memory. The storage configuration may be useable in configuring the storage system. The method may then operate to configure the storage system according to the storage configuration.

Figure 8:
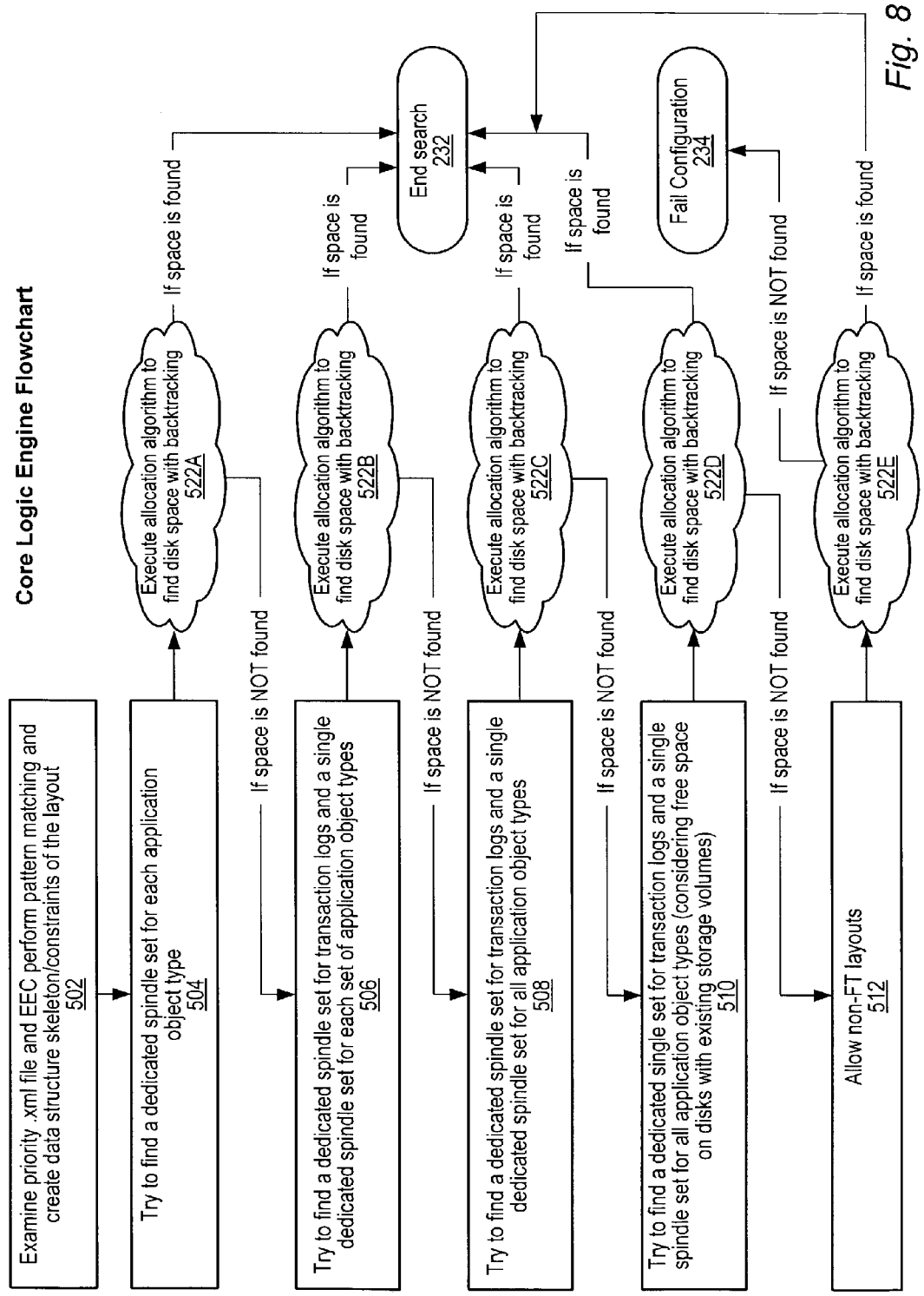
FIG. 8 is a more detailed flowchart diagram illustrating automatically determining a storage configuration according to one embodiment.

FIG. 8—Core Logic Engine

FIG. 8 is a flowchart diagram illustrating one embodiment of operation of the core logic engine 214. In FIG. 8, step 502 corresponds to step 442 of FIG. 7, steps 504–510 correspond to step 444 of FIG. 7, and steps 522A–E correspond to step 522 of FIG. 7.

As used herein, the term application object type refers to items in the application which require disk space. Examples include transaction logs, EDBs and STMs. In an exemplary embodiment where the application is Microsoft Exchange, exemplary application object types, (in this case referred to as exchange object types) would include transaction logs, Exchange DBs, and STMs.

As used herein, the term "dedicated spindle set" refers to disks or non-volatile storage elements which contain data for a given set of application object types and store no other significant data.

In step 502 the method examines the priority.xml document and the application specific layer 180 (e.g., the Exchange layer 180). In step 502 the method examines this information and performs pattern matching or text string matching in order to create a data structure or skeleton of the constraints of the layout to be created (the second data structure). In step 502 the method compares the text string entries in the priority document with the text string values created in the Exchange layout.xml file 234 to identify matches between these two documents. In response to these matches, the method then creates a second data structure, also referred to as a skeleton data structure, with the beginning organization of the storage configuration or layout. An example of operation of step 502 is discussed below.

In steps 504–510 and 522A–E the method determines groupings of application objects and attempts to allocate storage to these groupings to create the storage configuration. The allocation algorithm performed in 522 (522A–E) may be a "greedy" algorithm with back tracking, although other types of allocation algorithms may be performed. The allocation algorithm may be a top down algorithm or a bottom up algorithm, or a combination thereof. Any of various types of allocation algorithms may be used, as desired.

As shown, in step 504 the method uses the freespace.xml information to attempt to find a dedicated spindle set for each application object type. In performing step 504, the method performs an allocation algorithm in step 522 (referred to here as 522A) to attempt to find disk space for the layout. If the algorithm in step 522A locates disk space sufficient for a dedicated spindle set for each application object type, then the search completes in step 232.

If sufficient disk space is not found in 522A, then in step 506 the method attempts to find a dedicated spindle set for transaction logs and a dedicated spindle set for each set of application object types. Again, in performing step 506, the method performs the allocation algorithm of 522 (referred to here as 522B). If space is found, then the search completes in 232.

If sufficient space is not found in step 522B, then operation advances to step 508. In step 508 the method attempts to locate a dedicated spindle set for transaction logs, and a single dedicated spindle set for all application object types. Again, the algorithm of 522 (referred to here as 522C) is performed. If space is found, then the search completes in 232.

If sufficient space is not found in step 522C, then operation advances to step 510. In step 510 the method attempts to locate a dedicated spindle set for transaction logs, and a single spindle set for all application object types. In step 510, the method considers free space on disks with existing storage volumes (as opposed to step 508, which only considers disks without existing storage volumes). Again, the algorithm of step 522 (referred to here as 522D) is used in this process.

If sufficient space is not found in step 522D, then the method proceeds to step 512 to attempt to locate non-fault tolerant layouts. In step 512 the method attempts to determine any non-fault tolerant layouts using the algorithm of step 522 (referred to here as 522E). If a fault tolerant layout is determined in step 512, then the search ends in 232. If no non-fault tolerant layouts are able to be determined in step 512, then the configuration fails as illustrated in 234.

In an alternate embodiment, the methodology described in FIG. 8 is reversed, and a "bottom up" algorithm is used. In other words, all non-fault tolerant layouts are first examined to determine possible layouts, then operation proceeds to progressively improve storage layouts through step 510, then performs steps 508, 506 and 504. In this embodiment, once one of the operations fails to produce a valid result, then further operations need not be performed. In other words, if it is not possible to find a dedicated spindle set for transaction logs, in a single dedicated spindle set for all application object types and STMs together in step 508, then there is no point in performing either steps 506 or 504, since these solutions require even greater available disk free space than step 508.

In a currently preferred embodiment, the allocation algorithm uses a combination of bottom up and top down approaches. For example, the method may begin the analysis from a most expensive to least expensive file grouping (as shown in steps 504–510). For each determined file grouping (in one of steps 504–510), the method performs the allocation algorithm by starting with the lowest priority and least expensive volume option in priority.xml file and then working upward. As noted above, the allocation algorithm is performed to actually allocate volumes based on the file grouping. Thus the method may proceed through file groupings in a top down manner, and the allocation algorithm may proceed in a bottom up manner. After the method has found a volume for the sum of all file groupings, then an improvement pass may be performed, as described further below.

The following describes a currently preferred embodiment of a portion of the storage configuration creation process (i.e., steps 504–510 and 522A–E):

1. Obtain an initial grouping of objects, e.g. how files can be grouped on volumes. Specifically, the first pass generally attempts to keep each file on its own volume (and, therefore, it's own spindle set) to help optimize performance.
2. The allocation algorithm attempts to "create" and then map suggested volumes to the objects. "Create" in this sense does not mean to actually create the physical volume. Instead, the term "create" in this context means to reserve space from the "freeSpace.xml" data structure for the chosen volume.
   a. In the first pass, the storage configurator chooses the least expensive (least resource intensive) volume type available that is still fault tolerant—often a simple concatenated volume over hardware RAID, or a simple software mirror over a JBOD.
   b. The allocation algorithm attempts to create and assign a volume to each group of files:
      i. If the allocation algorithm runs out of space (e.g., all the available elements in freeSpace have been marked as reserved and there are still files that need volumes), the allocation algorithm returns to step 1 and obtains a different, less expensive, file grouping. It is generally easier to create a few big volumes rather than many smaller, specialized volumes. The very last time, the allocation algorithm will allow the creation of non-fault tolerant volumes as well.
      ii. If the allocation algorithm succeeds in finding an inexpensive volume for every file grouping, the allocation algorithm performs an "improvement pass". This pass goes through one disk group at a time, releases all the reserved objects for that disk group from FreeSpace, and then it tries to create a volume suggestion starting with the most expensive volume types, and working its way to the least expensive. This way, the allocation algorithm will produce at least as good of a layout as the starting layout, but the layout has a good likelihood of being improved.

FIGS. 9–12

Figure 9:
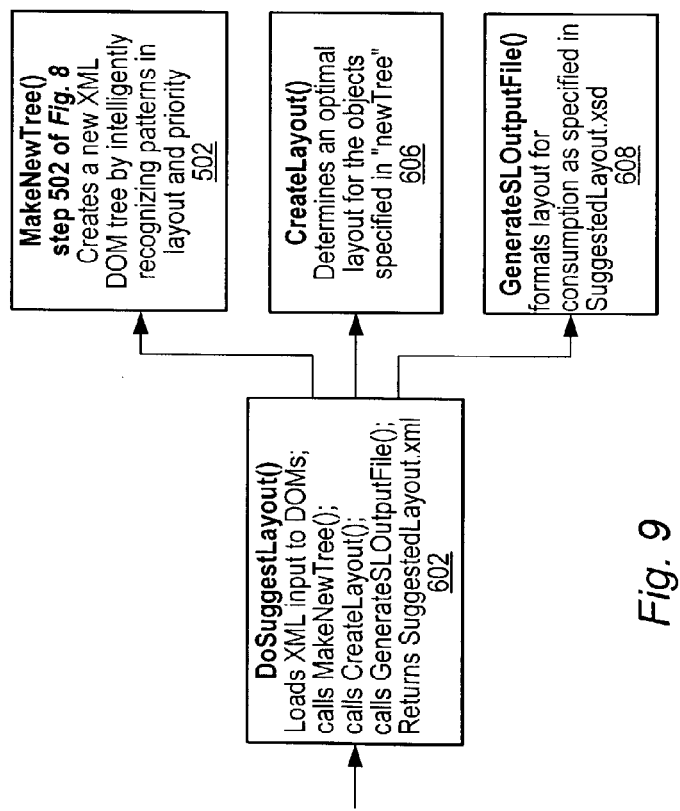

FIG. 9 is a flowchart diagram illustrating more detailed operation of the Core Logic Engine 214 as described in FIG. 8 above. As shown, in 602 the DoSuggestLayout( ) function is called. The DoSuggestLayout( ) function is essentially the "main( )" of the Core Logic Engine 214. The Core Logic Engine 214 receives the FreeSpace.xml file, i.e., the structure which contains all the information about the disks that are available for use by the application's storage needs, and an application specific Layout.xml file that contains the object hierarchy and space requirements for the application objects that need storage. The third input, the Priority.xml file, contains template information about which volume types are best for each application object type. The Priority.xml file is preferably a static file and is saved to disk at install time. The Priority.xml file is read from disk on the fly in MakeNewTree( ) so that the storage configurator can "understand" the rules for allocating space for the application's needs.

As shown, the DoSuggestLayout( ) function calls the MakeNewTree( ) step 502 (step 502 of FIG. 8). The MakeNewTree( ) function creates a new XML DOM tree by intelligently recognizing patterns in layout and priority. The MakeNewTree( ) function is described further in FIG. 10.

The DoSuggestLayout( ) function also calls the CreateLayout( ) function 606. The CreateLayout( ) function 606 determines an optimal layout for the objects specified in "newTree". The CreateLayout( ) function 606 corresponds to steps 504–512, and 522A–E of FIG. 8.

The DoSuggestLayout( ) function also calls the GenerateSLOutputFile( ) function 608. This function formats the layout for consumption as specified in SuggestedLayout.xsd.

Figure 10:
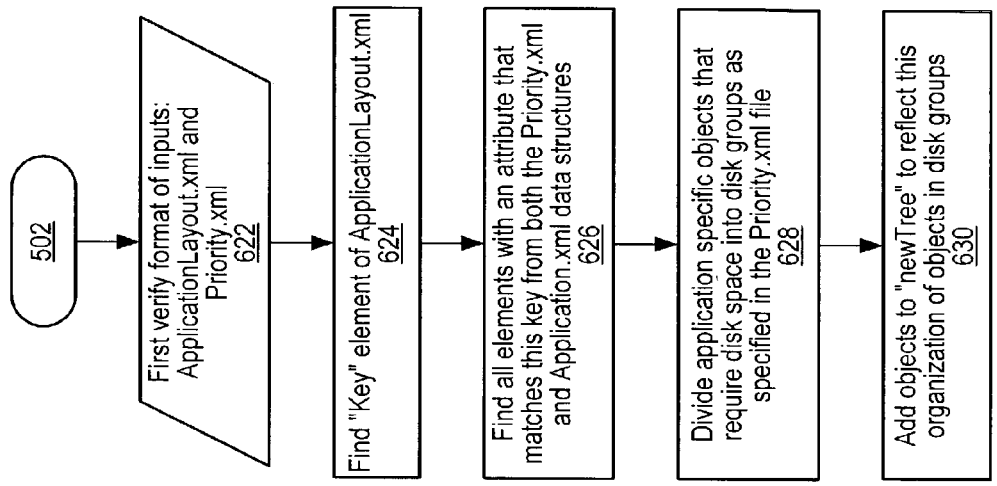
FIGS. 9–12 are flowchart diagrams illustrating automatically determining a storage configuration according to one embodiment.

FIG. 10 is a flowchart diagram illustrating more detailed operation of step 502. The operation in 502 creates a new XMLDOM tree by intelligently recognizing patterns in layout and priority. As shown, in 622 the method first verifies form of the inputs, ApplicationLayout.xml 234 and Priority.xml 224. In 624 the method finds the "key" element of ApplicationLayout.xml 234. In 626 the method finds all elements with an attribute that matches this key from both the Priority.xml and Application.xml data structures 224 and 234. In 628 the application specific objects that require disk space are first divided into disk groups as specified in the Priority.xml file 224. This is performed since the largest division of storage is on the disk group level. In 630 the method adds objects to the "newTree" data structure ("second data structure" or "skeleton data structure").

It is noted that different priority and layout files will yield different results. In the operation of this function, the "Key" elements of the two files are preferably equal. Both files should have elements with this "Key" attribute and these elements should have the same names in each file. This is how the storage configurator determines the structure for which it will be creating volumes. The priority file preferably has a "DiskGroup" element as well. This is how the storage configurator determines how to lay out Disk groups and volumes within the disk group. The newTree data structure is something of a combination of layout and priority that the storage configurator uses internally. The Priority.xml file describes how Exchange volume types and disk groups fit together. The ExchangeLayout.xml file represents the requested configuration in terms of Exchange. Since disk groups by definition need to have their own spindle set, the storage configurator preferably understands how disk groups fit into the Exchange configuration. The MakeNewTree( ) function takes these two files and merges their structures into newTree to reflect how disk groups fit into the Exchange picture.

Figure 11:
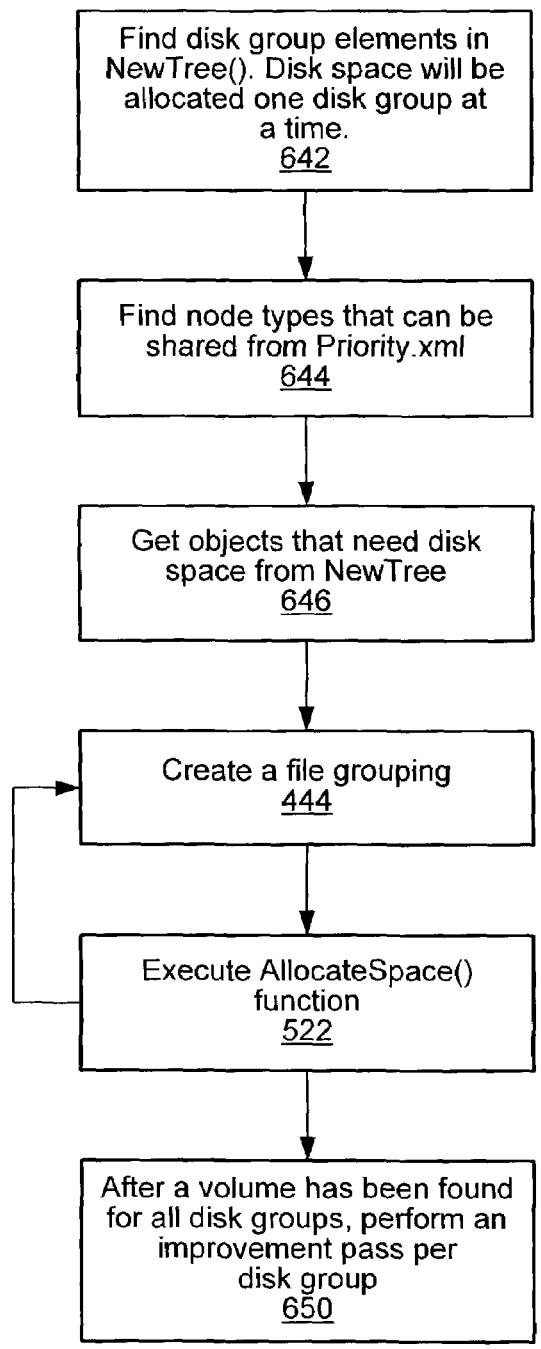

FIG. 11 is a flowchart diagram illustrating operation of the CreatetLayout( ) function. The CreatetLayout( ) function performs the actual generation of the layout of volumes to disks and application files to volumes.

As shown, in 642 the method finds the disk group element in the NewTree( ) data structure. It is noted that disk space will be allocated one disk group at a time. Steps 644 onward essentially perform steps 504, 506, 508 510, 512 and 522A–E of FIG. 8.

In 644 the method finds node types that can be shared from Priority.xml. In 646 the method obtains objects that need new space from the NewTree data structure.

In 444 the method creates a file grouping, as discussed above with respect to step 444 of FIG. 7.

In 522 the method executes the AllocateSpace( ) function to implement the allocation algorithm.

In one embodiment of steps 444 and 522, the method attempts to find a dedicated spindle set for each application object type (FIG. 8, 504). This is performed by getting lists of objects, where each list contains the set of objects that will reside together on a volume. Each list is a subset of "otNodes" (object type nodes). Then, the method calls "AllocateSpace( )" for each list of objects. The "AllocateSpace( )" method is the allocation algorithm performed in 522 (522A–522E) This process continues until either disk space has been found for every object in the otNodes list, or there is no more disk space available. Note that this algorithm preferably never creates more than one volume on a single set of disks.

After steps 444 and 522, i.e., after a volume has been found for all disk groups, in 650 the method may perform and "improvement pass" per disk group. As described above, if the allocation algorithm succeeds in finding an inexpensive volume for every file grouping, the allocation algorithm preferably performs an "improvement pass". This pass examines one disk group at a time, releases all the reserved objects for that disk group from FreeSpace, and then attempts to create a volume suggestion starting with the most expensive volume types, and working its way to the least expensive. This way, the allocation algorithm will produce at least as good of a layout as the starting layout, but the layout has a good likelihood of being improved.

The improvement pass performs operations similar to those described in step 672 below, except the improvement pass starts from top to bottom, instead of bottom to top.

Figure 12:
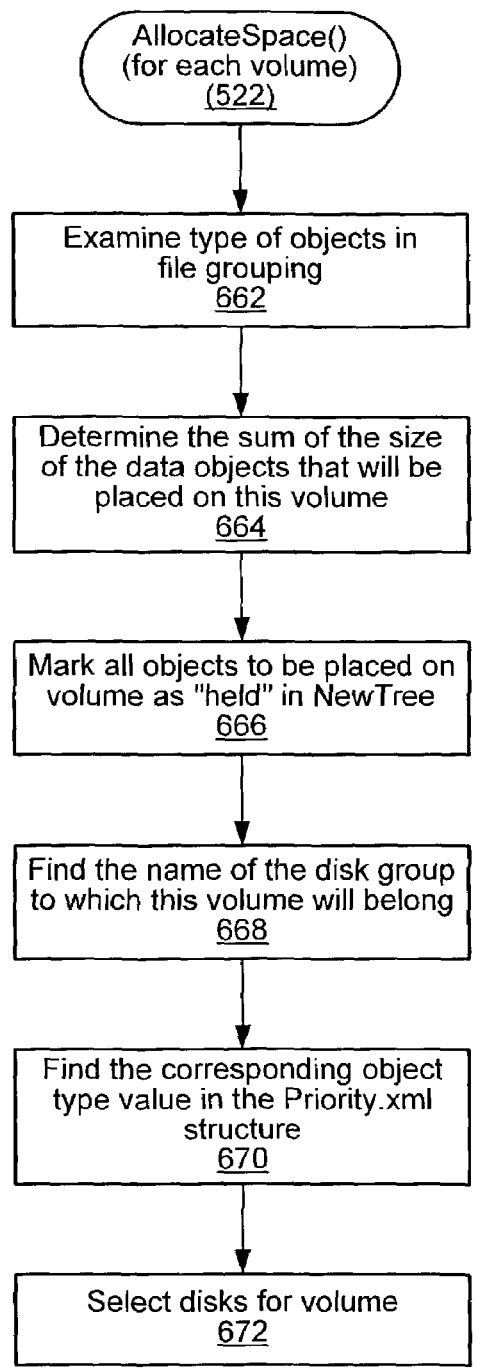

FIG. 12 is a flowchart diagram illustrating operation of the AllocateSpace( ) method. This preferred embodiment of the AllocateSpace( ) method performs a combination of a bottom up and top down algorithm with a refinement layer to find disk space. The method in FIG. 12 is preferably performed for each file group and/or volume.

As shown, in 662 the method examines the type of objects in the list of files from the current file group. In 664 the method gets the sum of the size of the data objects that will be placed on the volume. In 666 the method marks all objects to be placed on volume as "held" in NewTree. In 668 the method finds the name of the disk group to which this volume will belong. In 670 the method finds the corresponding object type value in the Priority.xml data structure.

In 672 the method selects disks for the volume as described below. As described above with respect to FIG. 8, the allocation algorithm attempts to "create" and then map suggested volumes to the objects. "Create" in this sense does not mean to actually create the physical volume. Instead, the term "create" in this context means to reserve space from the "freeSpace.xml" data structure for the chosen volume. In the first pass, the storage configurator chooses the least expensive (least resource intensive) volume type available that is still fault tolerant—often a simple concatenated volume over hardware RAID, or a simple software mirror over a JBOD." This is performed by traversing the disk specifications for the given file type in the Priority.xml file from the bottom up. Each volume type specified in the Priority.xml file contains both a hardware RAID type and a software RAID type specification. First, the algorithm finds all of the available disk objects in FreeSpace.xml that are of the given hardware RAID type.

If there are disks of the specified hardware RAID type, the algorithm checks the following:

a) if there are enough spindles of that type available to create the software RAID volume (i.e., at least 2 spindles are required for software mirrored or striped volumes, and at least 4 spindles are required for software striped mirrored volumes).

b) if there are enough spindles available, the algorithm proceeds to calculate the actual amount of disk space needed given the requested volume size for the data, and the extra requirements a given software RAID volume might need. For example, if the specified software volume type is a mirrored volume, by default the storage configurator will enable dirty region logging for more optimal volume performance. In this case, the algorithm will add the amount needed for the log to the total volume size.

c) then the algorithm passes the list of LUNs (a.k.a. disks or spindles), the total amount of space needed, and the type of software RAID specified to a PickLUNs( ) function. The PickLUNs( ) function finds a subset of those LUNs that fulfills the volume requirements, and then reserves those LUNs for the given volume. The PickLUNs( ) function thus finds a set of disks that will fulfill the volume requirements.

Figure 13:
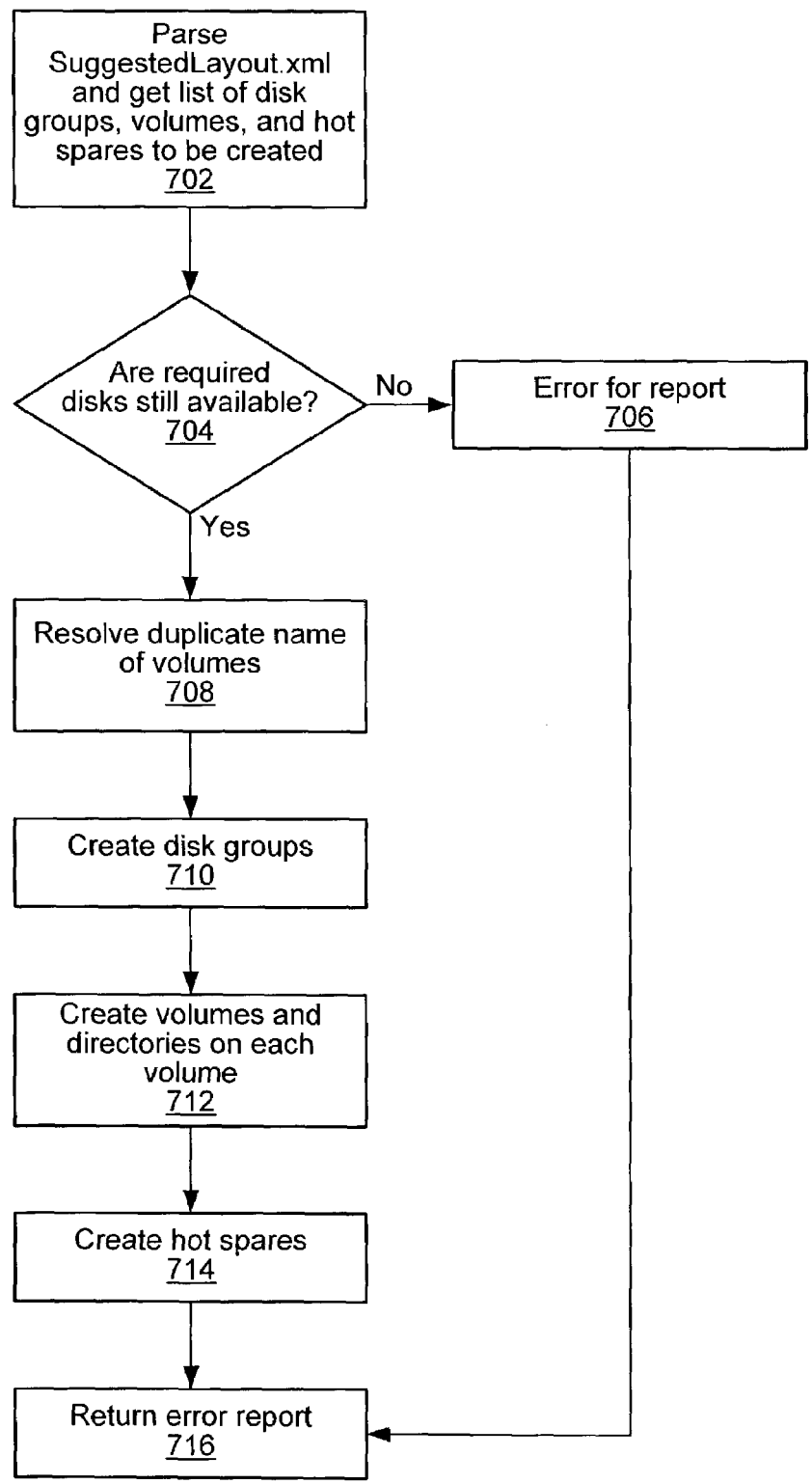
FIG. 13 is a flowchart diagram illustrating implementing a storage configuration on a storage system.

FIG. 13—Implementor

FIG. 13 is a flowchart diagram illustrating operation of the implementor 216. As shown, in step 702 the implementor 216 parses the suggested layout.xml file and obtains a list of disk groups, volumes and hot spares to be created.

In step 704 the method determines if all required disks are still available. If all required disks are determined to not be still available in step 704, then in step 706 an error is recorded for the report to be generated. Operation then proceeds to step 716 where the error report is returned. In this instance, the error report will indicate an error has occurred, since all required disks are not available to implement the layout in the suggested layout.xml file.

If all required disks are determined to still be available in step 704, then in step 708 the method resolves any duplicate names of volumes. In step 710 the method creates disk groups. In step 712 the method creates volumes and directories on each volume. In step 714 the method creates any hot spares. In step 716 the method returns an error report. If the implementor 216 successfully implemented the suggested layout, then the error report will return indicating no error.

Example Data Structures

Exemplary FreeSpace.xml
Returned by the Discoverer component;
Contains all free space on the system.

```
<FreeSpaceDescFile>
    <!--FreeSpaceDesc file generated by Discoverer-->
    . .. HEADER . . .
    <StorageLayout>
        <LocallyAttachedStorage>
            <LUN>
                <ID>
                    <DisplayName>Harddisk7</DisplayName>
                    <InternalID><![CDATA[SCSI\DISK&VEN_IBM&
    PROD_DDRS-34560D&REV_DC1B\5
                </ID>
                <TotalSpace>4565030400</TotalSpace>
                <FreeSpace>4565030400</FreeSpace>
                <IsDynamic>false</IsDynamic>
                <IsBCV>false</IsBCV>
                <IsFaultTolerant>false</IsFaultTolerant>
                <TypeOfRAID>NORAID</TypeOfRAID>
            </LUN>
```

Exemplary UserInput.xml
Output by a GUI;
Contains all values the user typed in

```
<?xml version="1.0"?>
<UserInputs xmlns:xsi="http://www.w3.org/2000/10/XMLSchema-
instance" xsi:
    . . . HEADER . . .
    <SpecialFlags>
        <GetExistingExchangeInfo>true</GetExistingExchangeInfo>
        <Caller>RuntimeUI</Caller>
        <CreateStorageGroup>false</CreateStorageGroup>
        <CreateDatabase>false</CreateDatabase>
        <StorageGroupName/>
    </SpecialFlags>
    <UserPriority>MaxCapacity</UserPriority>
    <ClusteringEnabled>false</ClusteringEnabled>
    <UserGroup>
        <Name>TechSupport</Name>
        <NumberOfUsers>30</NumberOfUsers>
        <MaxMailBoxSize>100</MaxMailBoxSize>
    </UserGroup>
    <Backup>
        <MaxParallelBackups>1</MaxParallelBackups>
        <BackupCapacity>1222222</BackupCapacity>
    </Backup>
</UserInputs>
```

Exemplary ExchangeLayout.xml

```
<ExchangeLayout>
    <!-- Exchange Layout file generated by EEL -->
    . . . HEADER . . .
    <UserPriority>MaxCapacity</UserPriority>
    <OffHostBackup>true<OffHostBackup>
    <ClusteringEnabled>false</ClusteringEnabled>
    <Key>EX</Key>
    <RootMountPoint>ExchangeMountPoints</RootMountPoint>
```

```
<EXServer Key="EX">
    <EXStorageGroup Key="EX">
        <Name>StorageGroup01</name>
        <EXTransLogs Key="EX">
            <Name>StorageGroup01TransLogs</Name>
            <Size>1363148800</Size>
        </EXTransLogs>
        <EXDatabase Key="EX">
            <Name>TechSupport</Name>
            <EXEDB>
                <Name>TechSupportEDB</Name>
                <Size>3145728000</Size>
            </EXEDB>
            <EXSTM>
                <Name>TechSupportSTM</Name>
                <Size>3145728000</Size>
```

Exemplary Priority.xml

Installed by VERITAS Edition;

Gives relative preferences for each type of storage to each type of Exchange volume.

```
<PriorityFile xmlns:xsi="http://www.w3.org/2000/10/XMLSchema-instance"
xsi:noNamespaceSch
    ... HEADER ...
    <Key>EX</Key>
    <PrioritySuggestions>
        <EXServer Key="EX">
            <EXStorageGroup>
                <DiskGroup>
                    <EXTransLogs Key="EX">
                        <DedicatedSpindleSetRequired>
                            <MaxCapacity>true</MaxCapacity>
                            <Default>true</Default>
                            <HighPerfAvail>true</HighPerfAvail>
                        </DedicatedSpindleSetRequired>
                        <PriorityConfig>
                            <TypeOfRAID>
                                <SWType>NORAID</SWType>
                                <HWType>RAID0+1</HWType>
                            </TypeOfRAID>
                            <Priority>
                            <Default>20</Default>
                            <NumDisks ActualNumberOfSpindles="4">1</NumDisks>
                            <TypeOfFS>NTFS</TypeOfFS>
                        </PriorityConfig>
```

Exemplary SuggestedLayout.xml (Storage Configuration Produced by the Method)

```
<SuggestedLayoutFile xmlns:xsi="http://www.w3.org/2000/10/XMLSchema-instance"
xsi:noNamespaceSchemaLocation=".\StoreConfig.xsd">
    <!--SuggestedLayout.xml file generated by StorageConfigurator-->
    ... HEADER ...
    <RootMountPoint>ExchangeMountPoints</RootMountPoint>
    <VolumeLayout>
        <LocallyAttachedStorage>
            <DiskGroup ClusterDiskGroup="false">
                <Name>StorageGroup01DiskGroup</Name>
                <Volume>
                    <Name>StorageGroup01TransLogs</Name>
<MountPoint>F:\ExchangeMountPoints\StorageGroup01TransLogs</MountPoint>
                    <FSType>NTFS</FSType>
                    <Size>1363148800</Size>
                    <RAIDType>
                        <SWType>RAID1+0</SWType>
                        <HWType>NORAID</HWType>
                    </RAIDType>
                    <ConsistsOf>
                        <LU>
                            <DisplayName>Harddisk7</DisplayName>
                            <InternalID><![CDATA[SCSI\DISK&VEN_IBM&PROD_DDRS-
34560D&REV_                    </LU>
                        <LU>
                            <DisplayName>Harddisk8</DisplayName>
                            <InternalID><![CDATA[SCSI\DISK&VEN_IBM&PROD_DDRS-
34560D&REV_
                        </LU>
                        ... TOTAL OF 4 OF THESE FOR RAID 1+0 (Mirrored Stripe)
                    </ConsistsOf>
                <FilesOnVolume>
                    <File>
                        <FileName>StorageGroup01TransLogs</FileName>
                        <ObjectType>EXTransLogs</ObjectType>
                        <ParentObject>
                            <Name>StorageGroup01</Name>
                            <Type>EXStorageGroup</Type>
                        </ParentObject>
<PathName>F:\ExchangeMountPoints\StorageGroup01TransLogs\StorageGroup01
                    </File>
                </FilesOnVolume>
            </Volume>
```

FIGS. 14 and 15—Screen Shots

FIGS. 14A–O and 15A–X are screen shots illustrating one embodiment of a graphical user interface that may be used by a user to specify information for automatic creation of a layout as described herein. FIGS. 14A–O and 15A–X relate to embodiments where the software application is Microsoft Exchange.

Figure 14A:
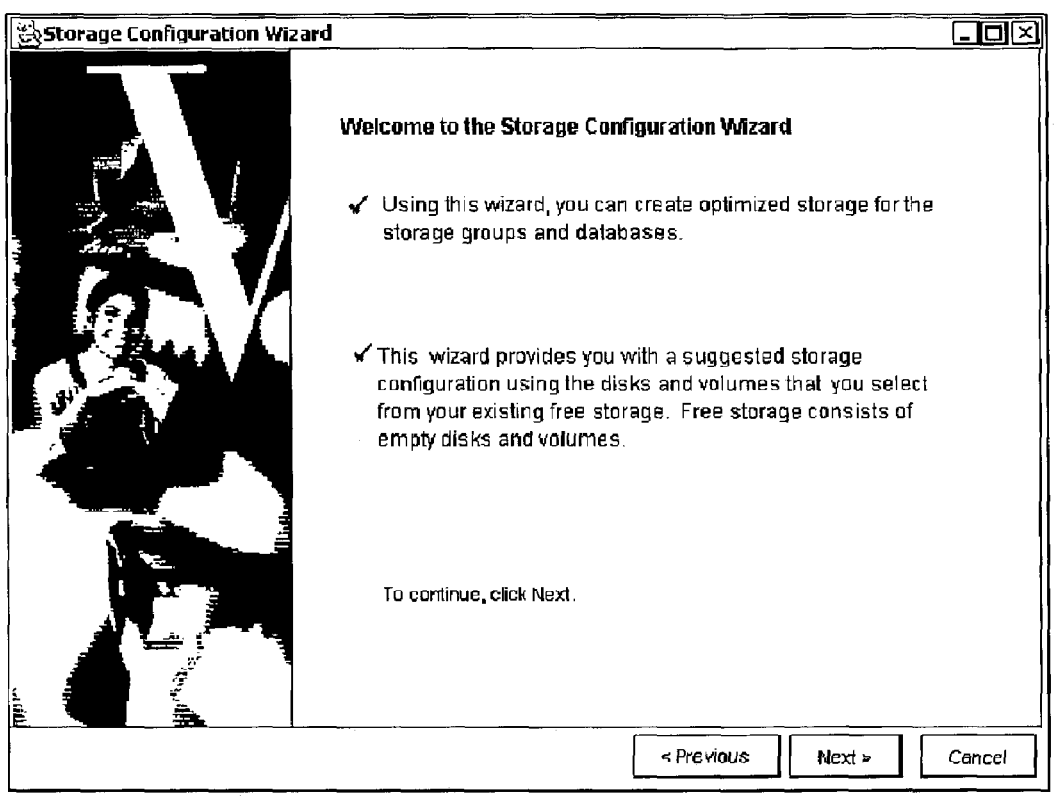
FIGS. 14A–O are screen shots illustrating one embodiment of a graphical user interface that may be used to specify information used in automatically determining a storage configuration according to one embodiment.
Figure 14B:
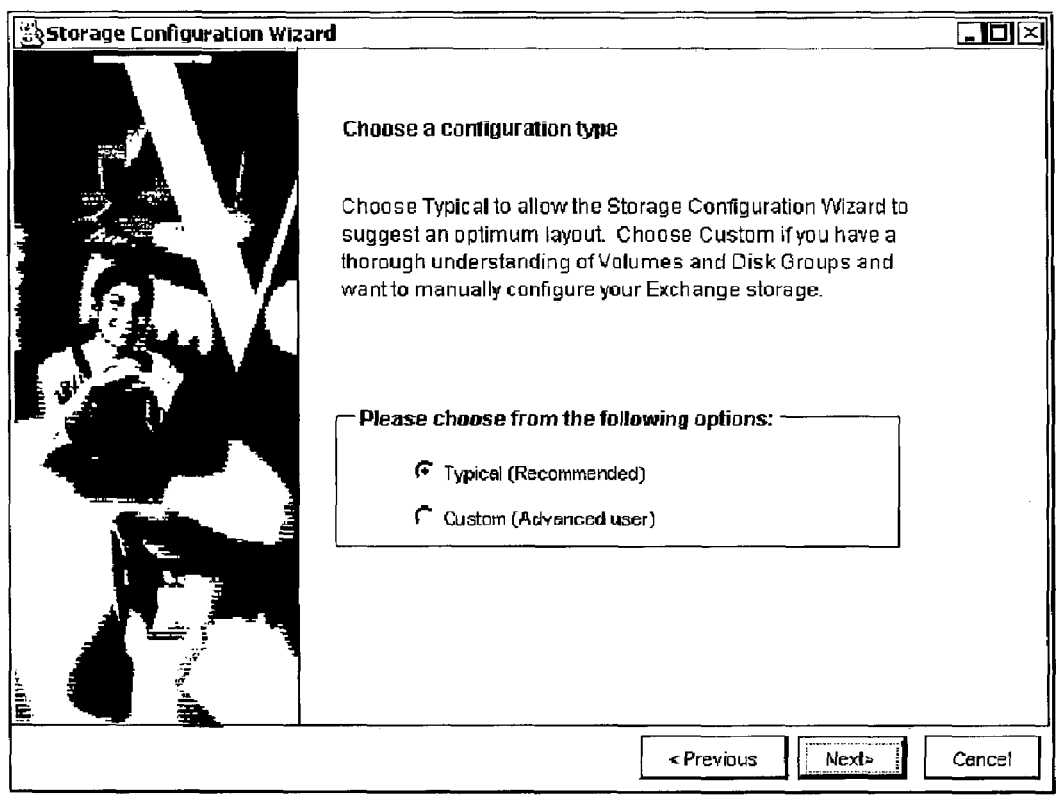
Figure 14C:
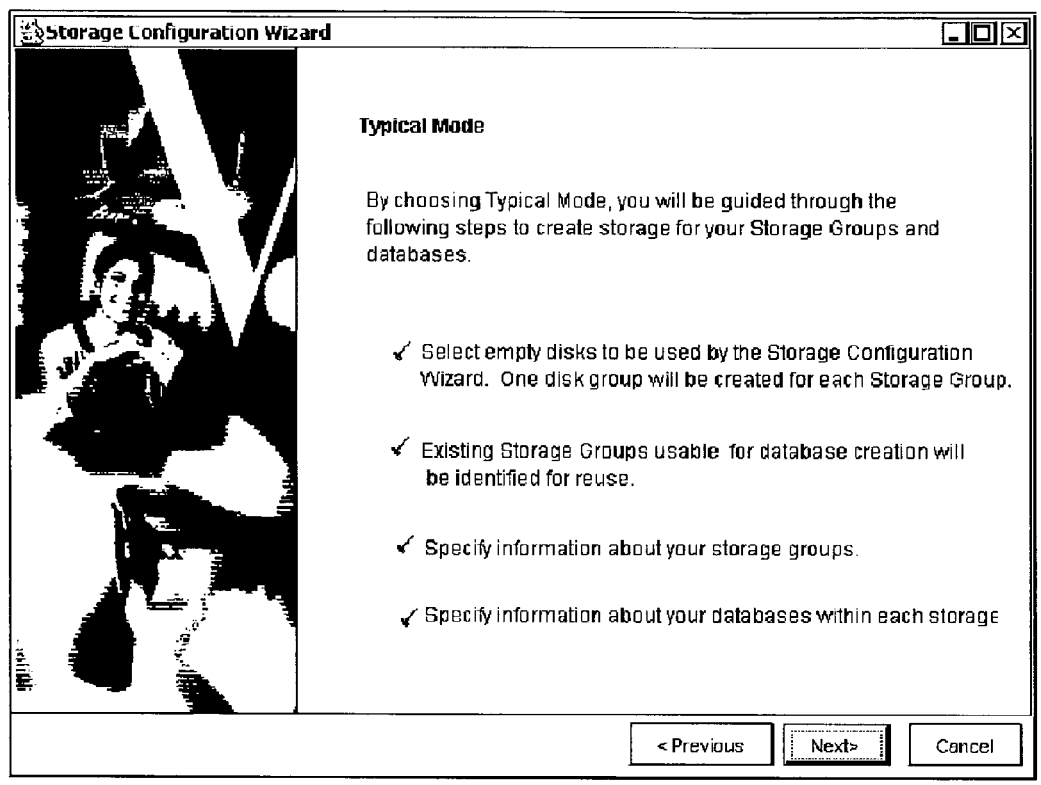
Figure 14D:
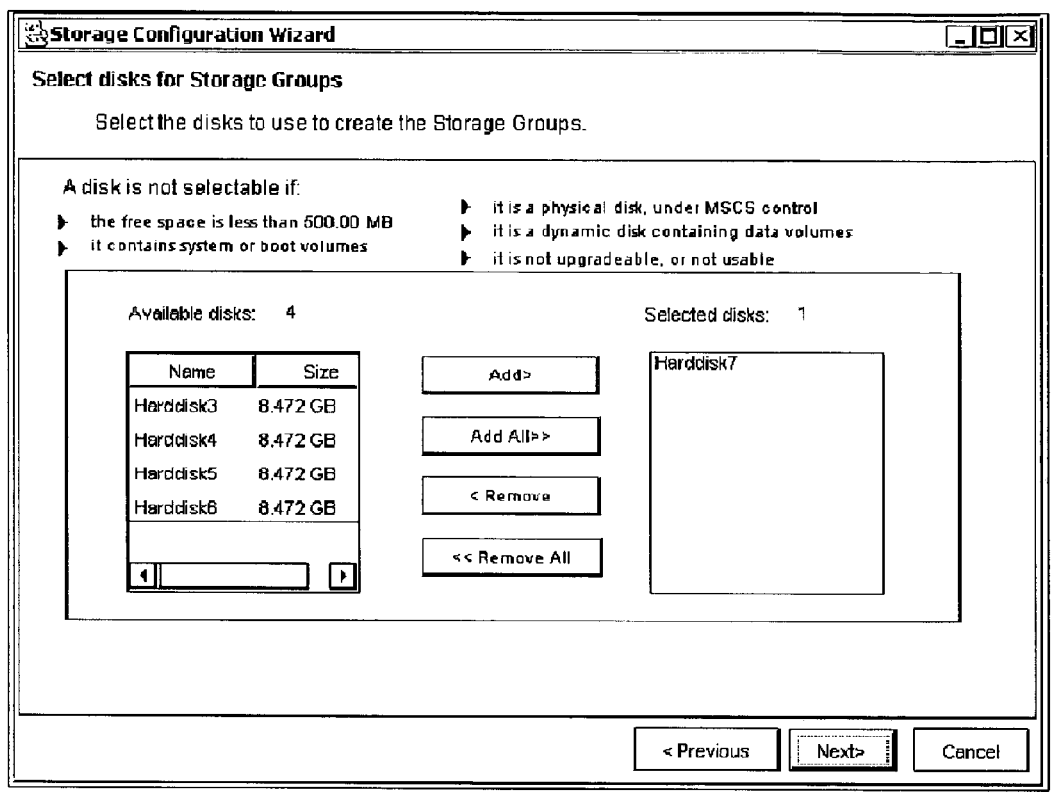
Figure 14E:
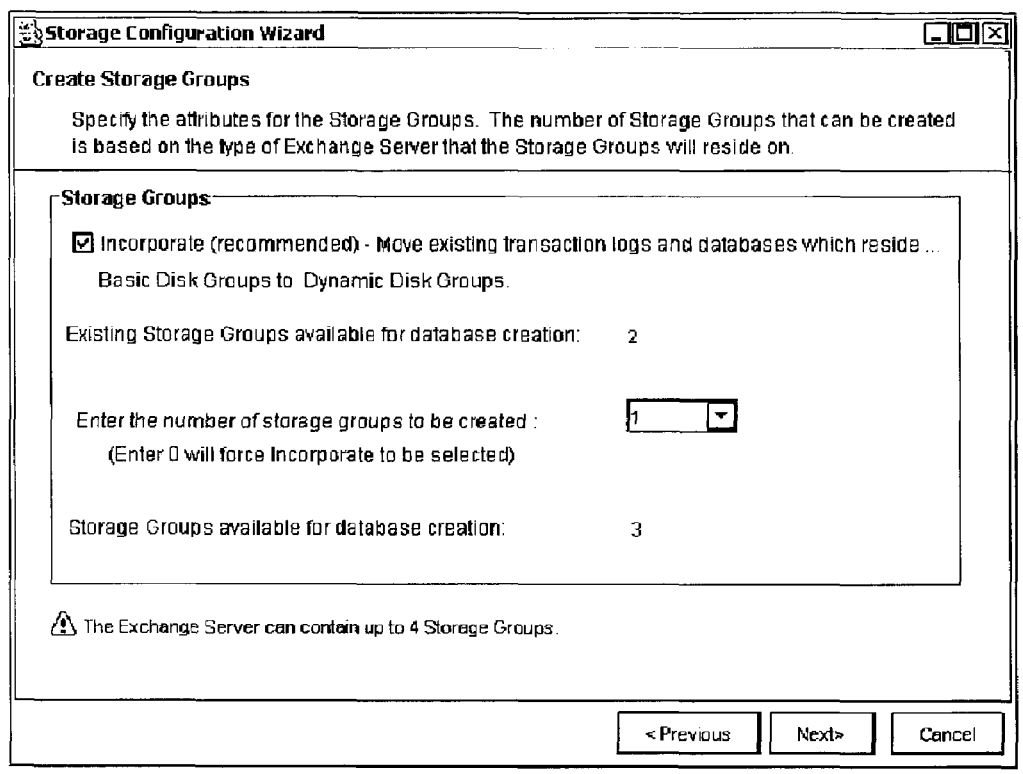
Figure 14F:
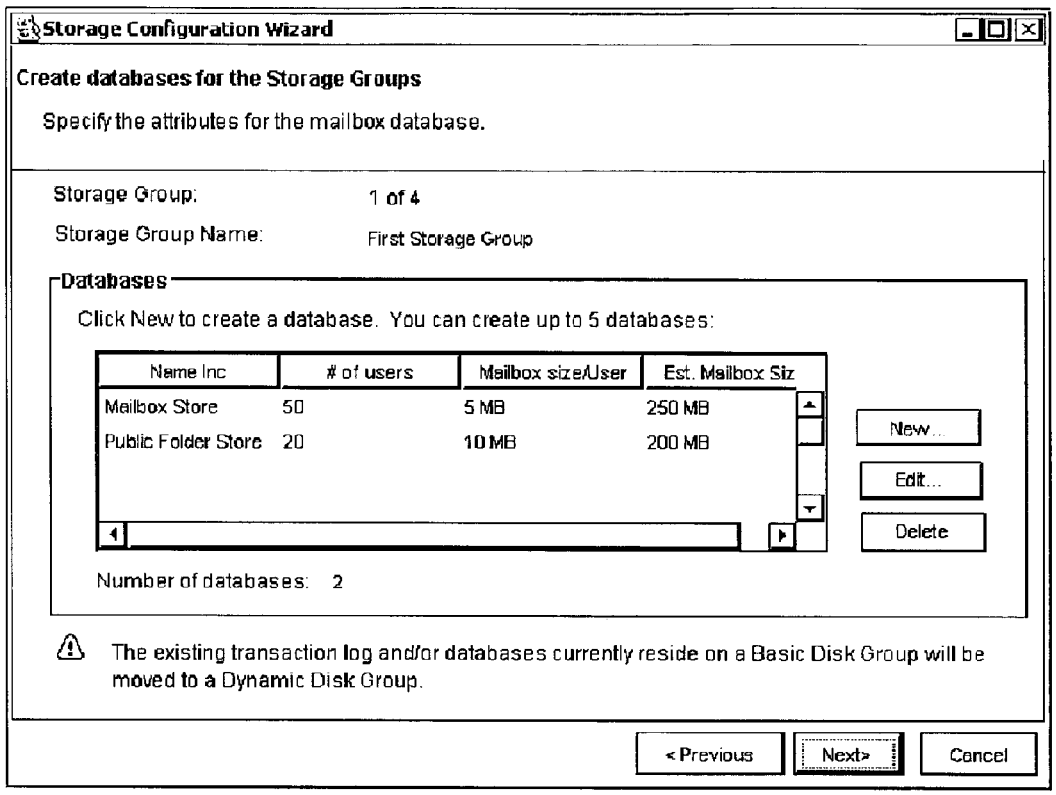
Figure 14G:
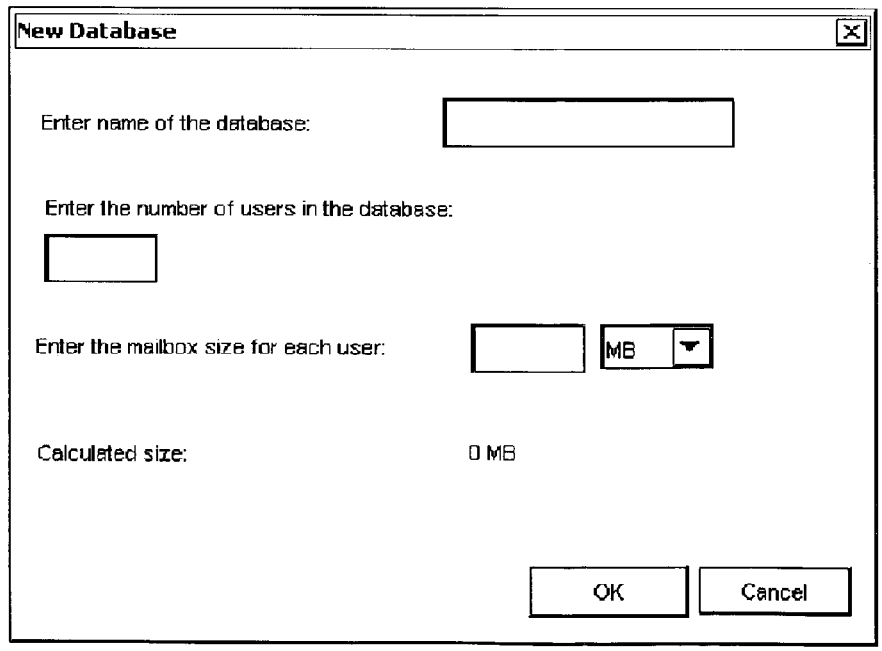
Figure 14H:
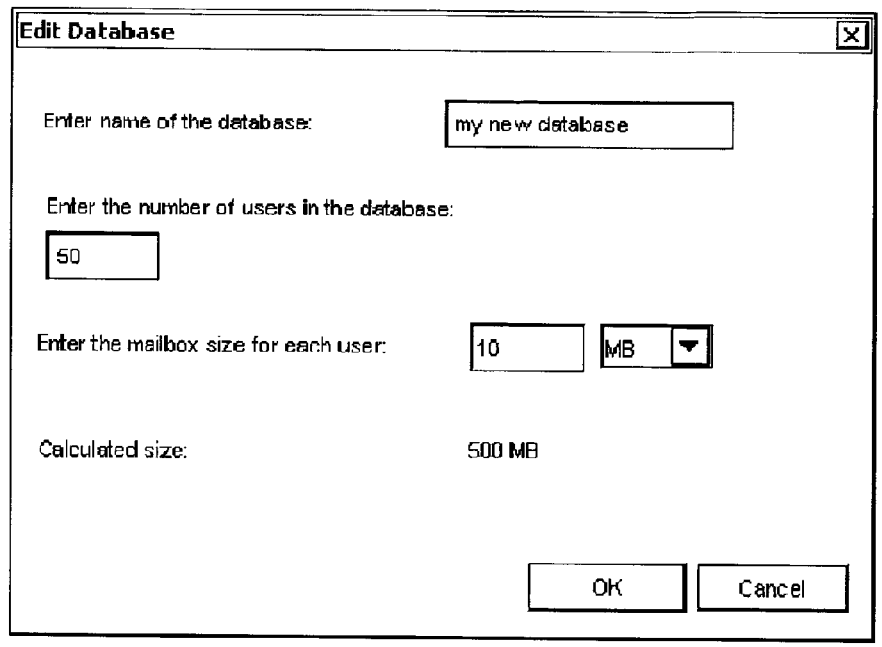
Figure 14I:
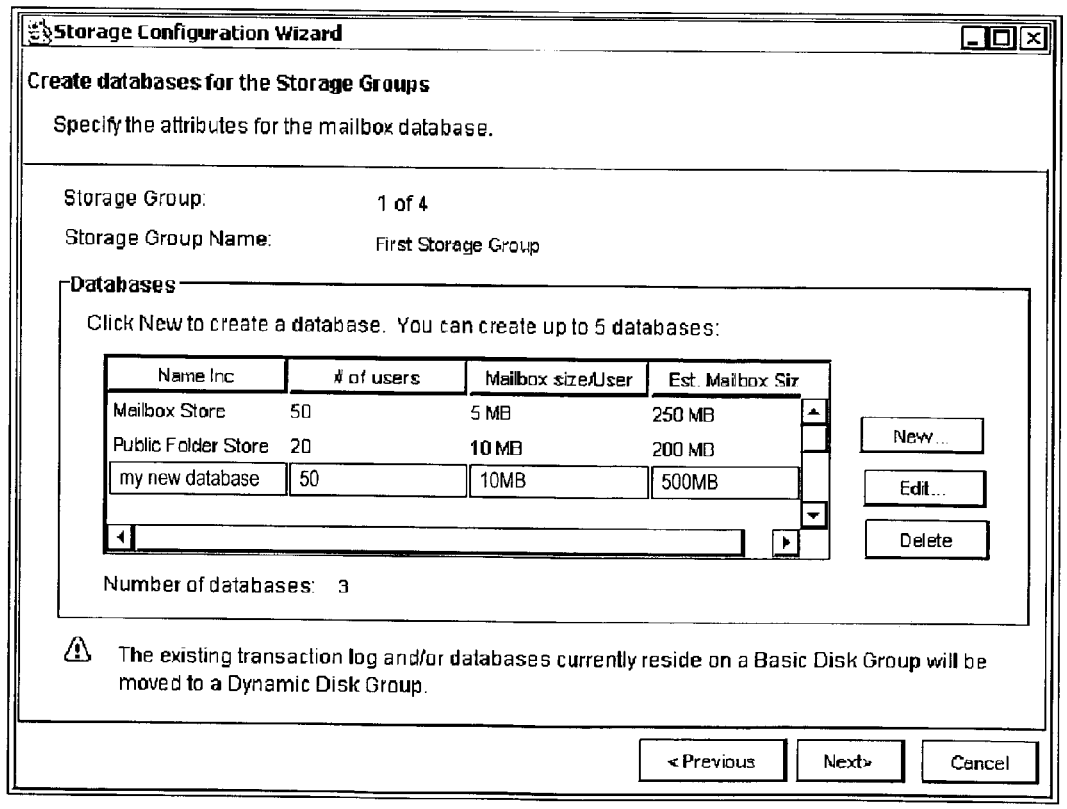
Figure 14J:
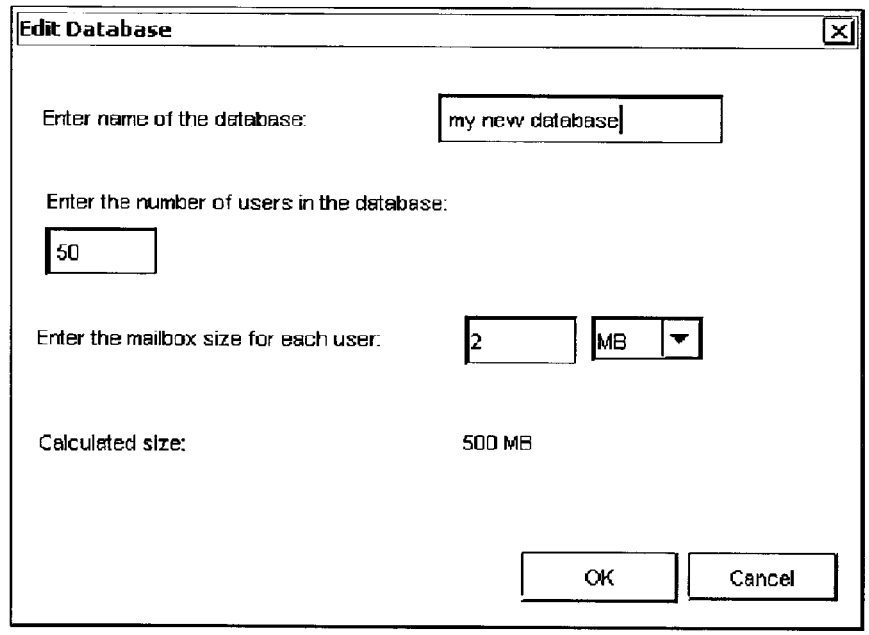
Figure 14K:
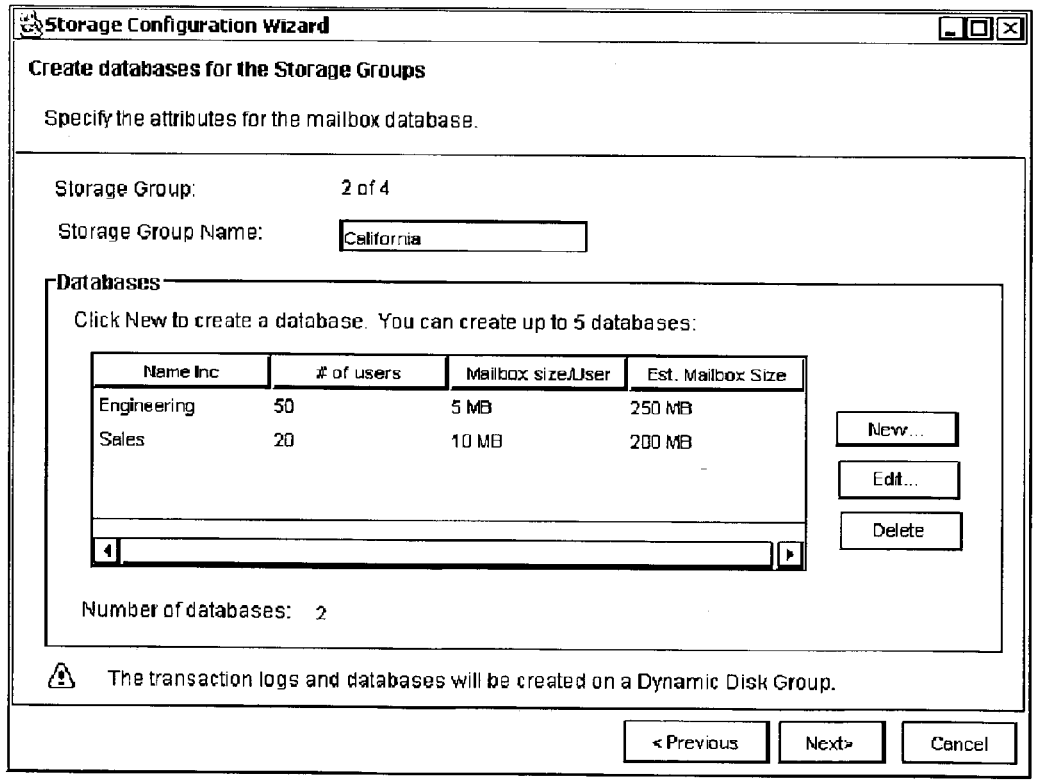
Figure 14L:
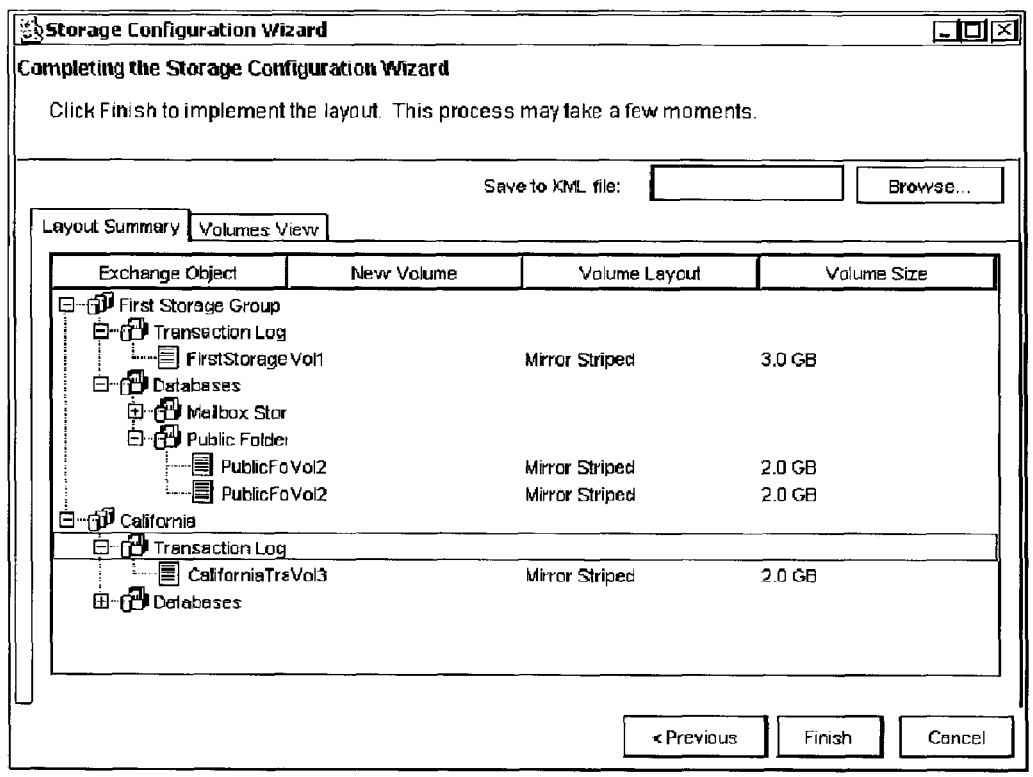
Figure 14M:
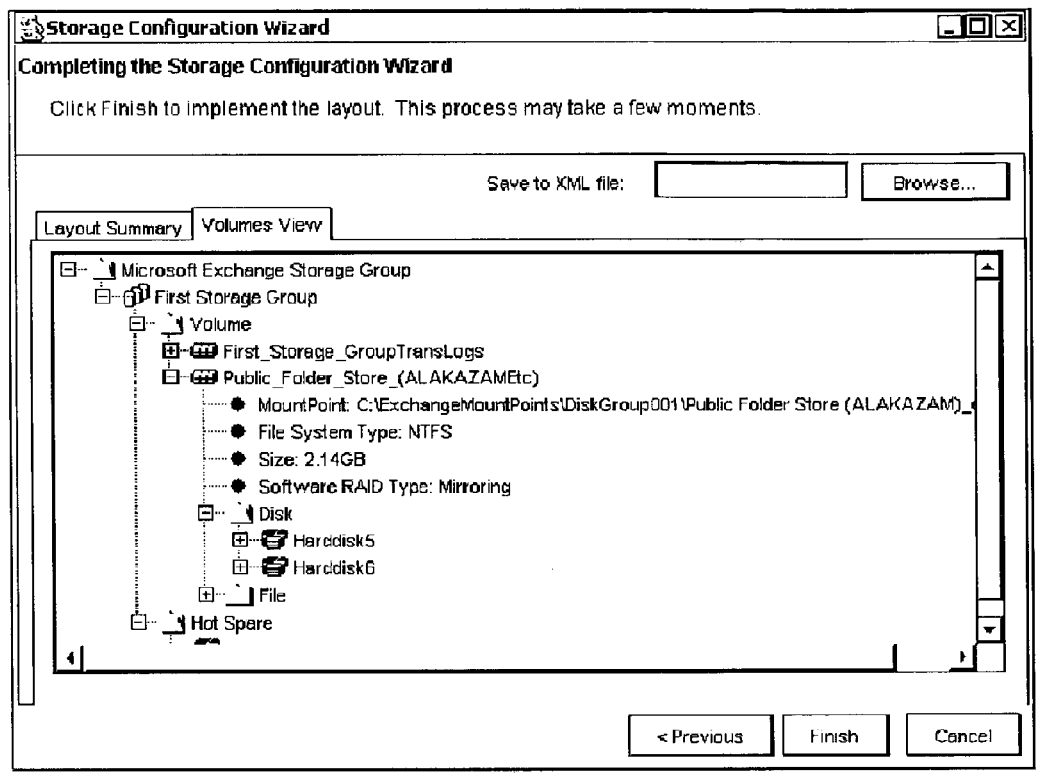
Figure 14N:
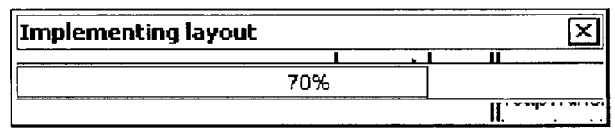
Figure 14O:
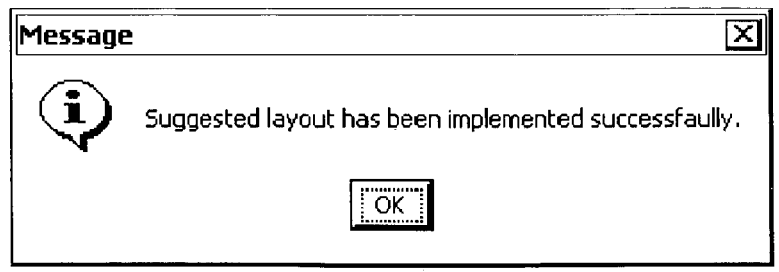

FIGS. 14A–O are screen shots of a storage configuration wizard according to one embodiment. These screen shots describe operation when the user selects the "typical mode" in FIG. 14B.

Figure 15A:
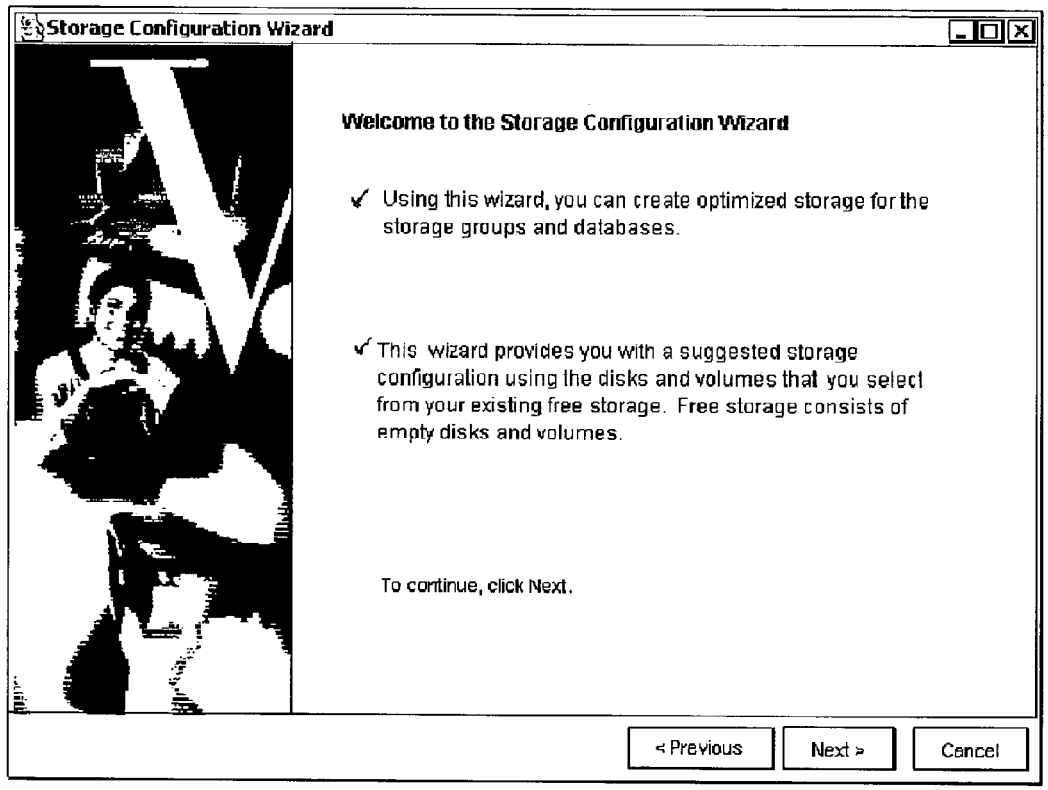
FIGS. 15A–X are screen shots illustrating one embodiment of a graphical user interface that may be used to specify information used in automatically modifying an existing storage configuration according to one embodiment.
Figure 15B:
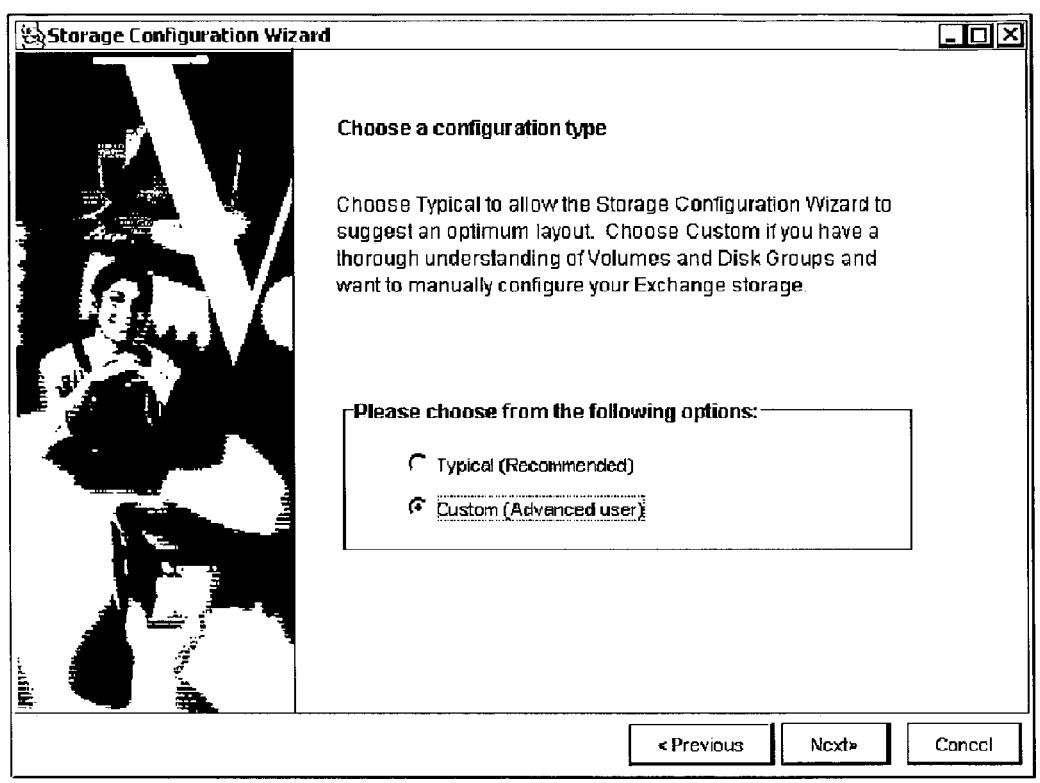
Figure 15C:
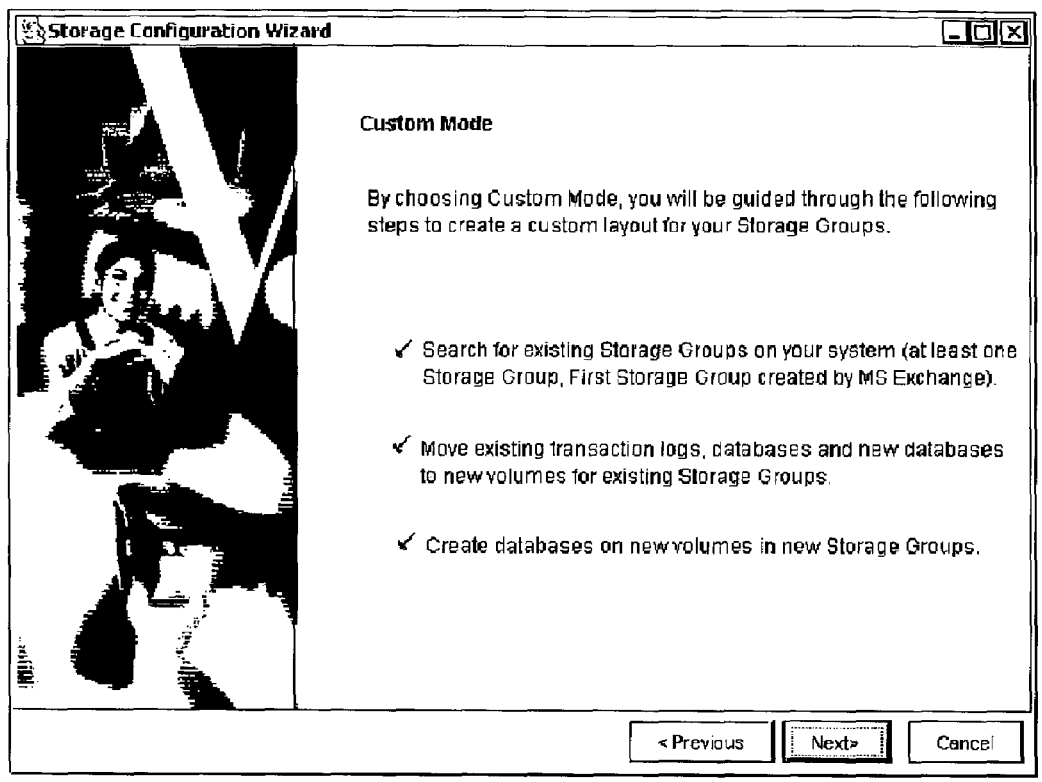
Figure 15D:
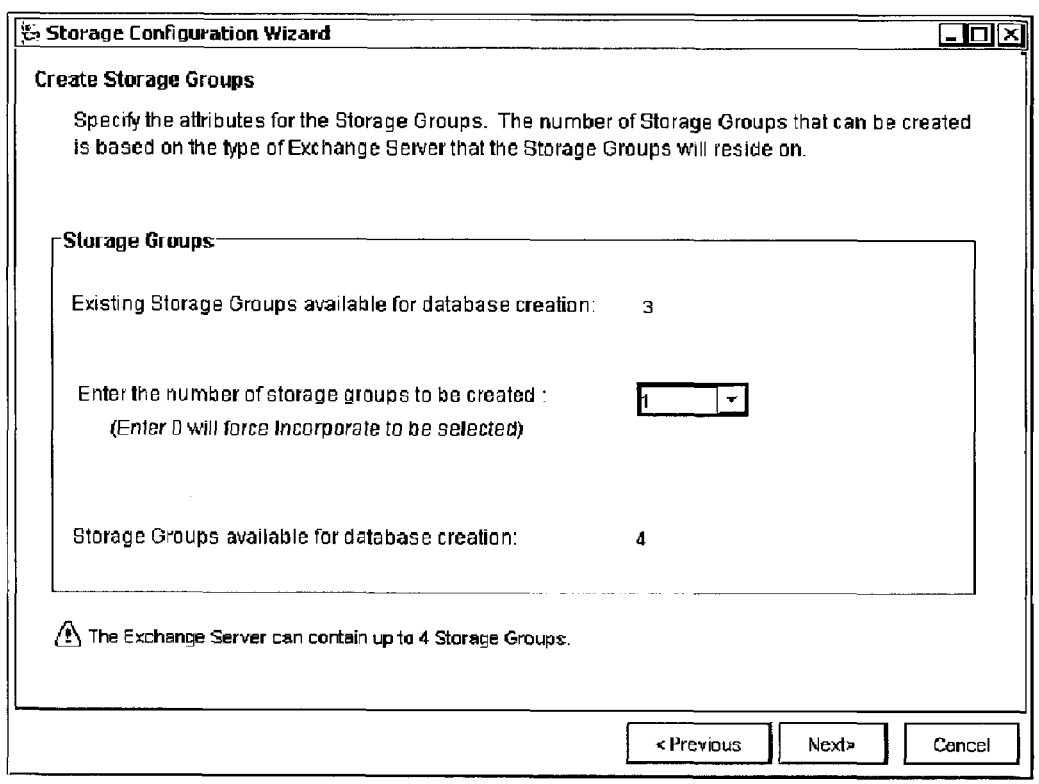
Figure 15E:
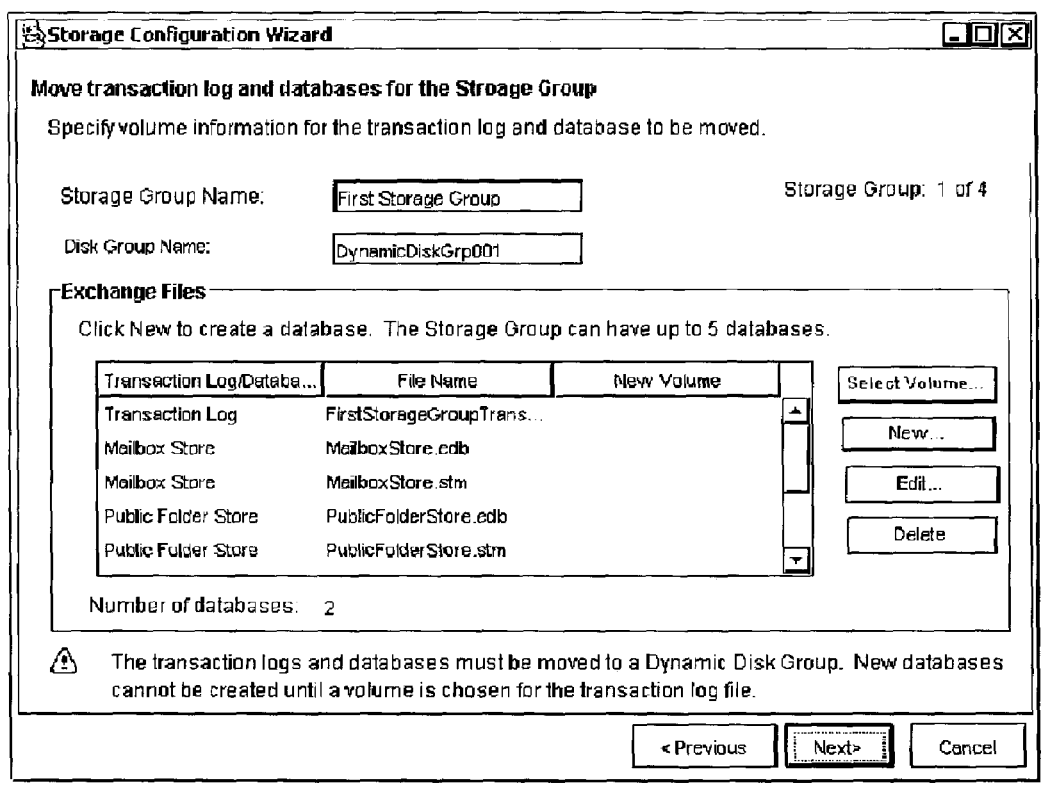
Figure 15F:
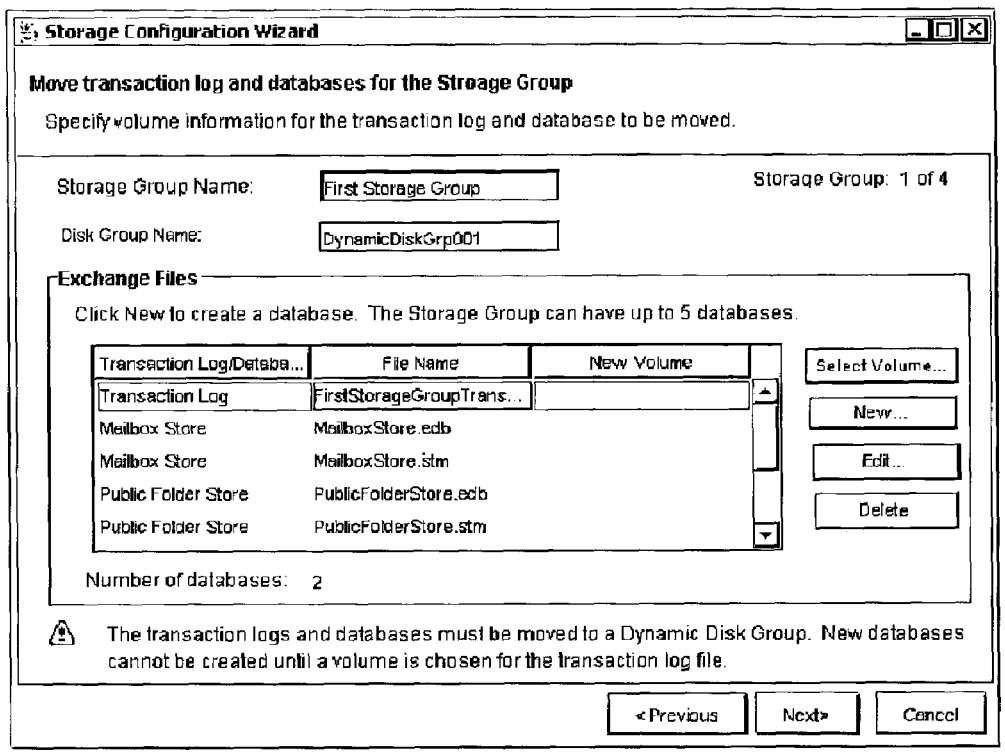
Figure 15G:
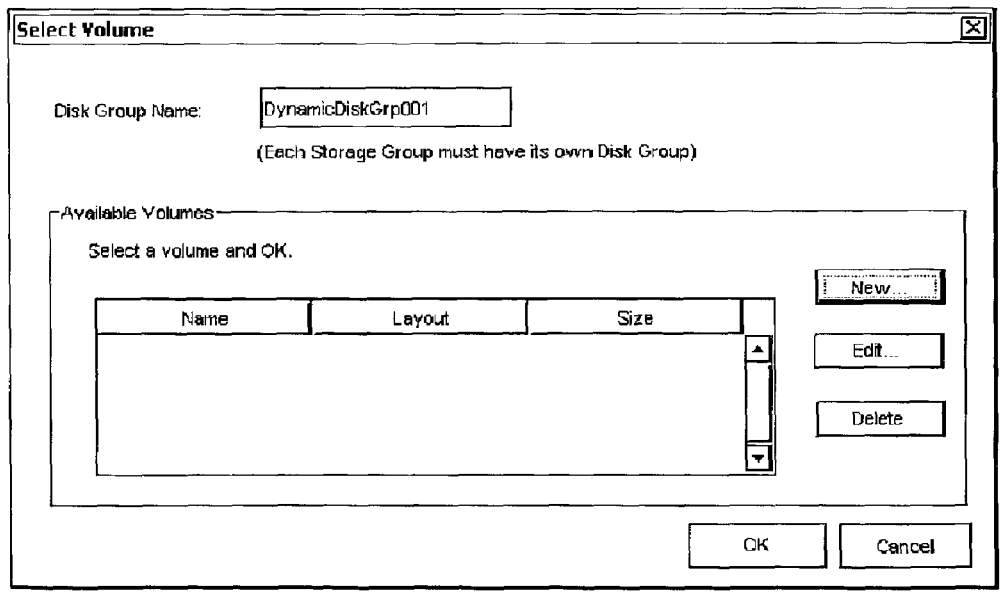
Figure 15H:
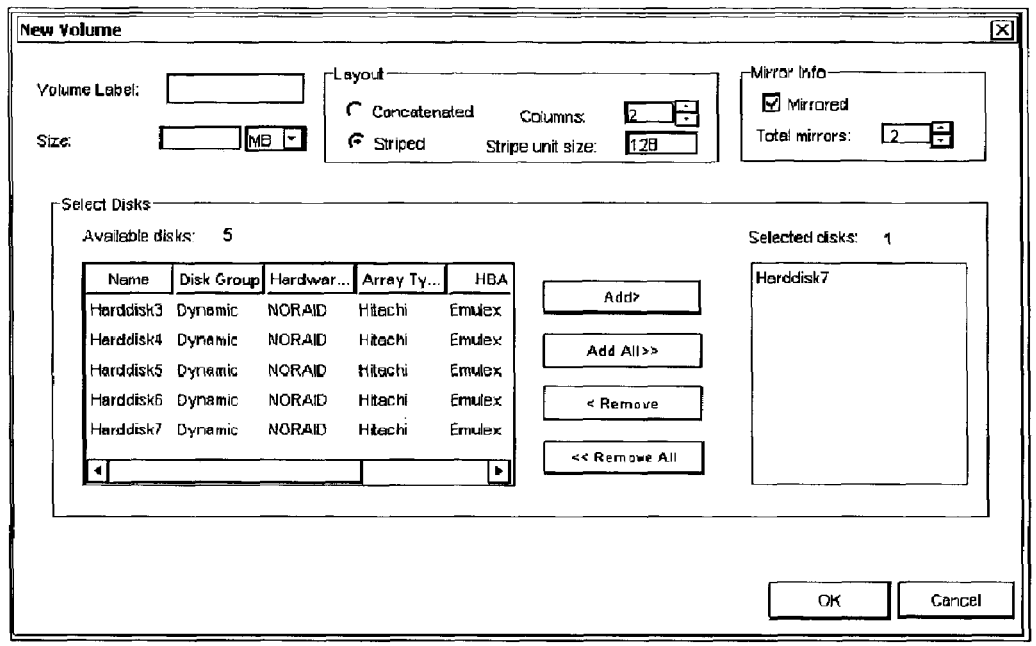
Figure 15I:
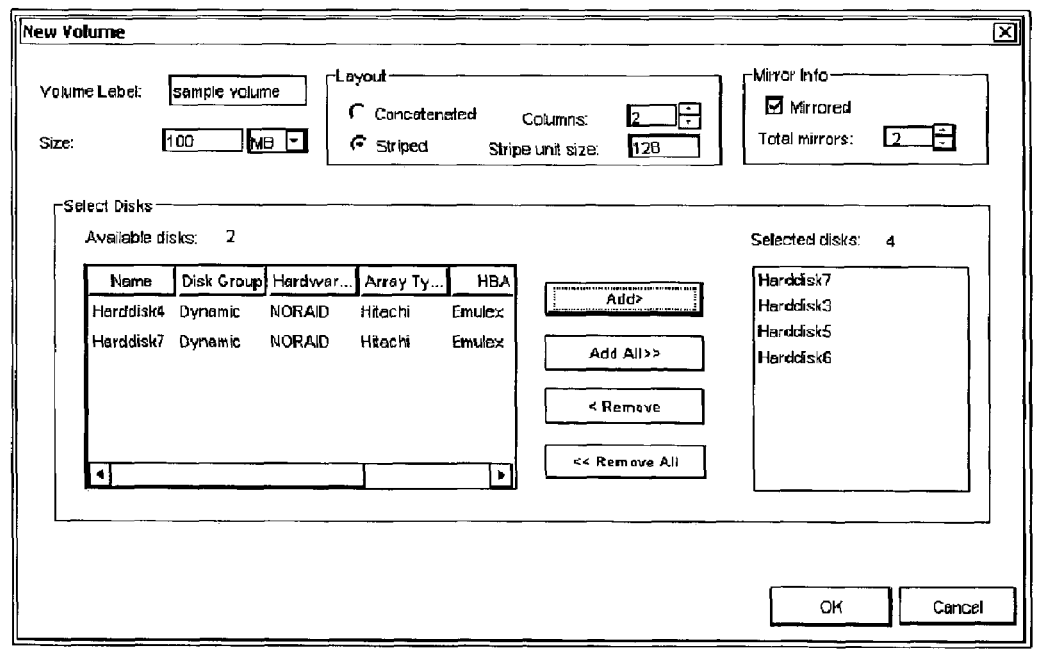
Figure 15J:
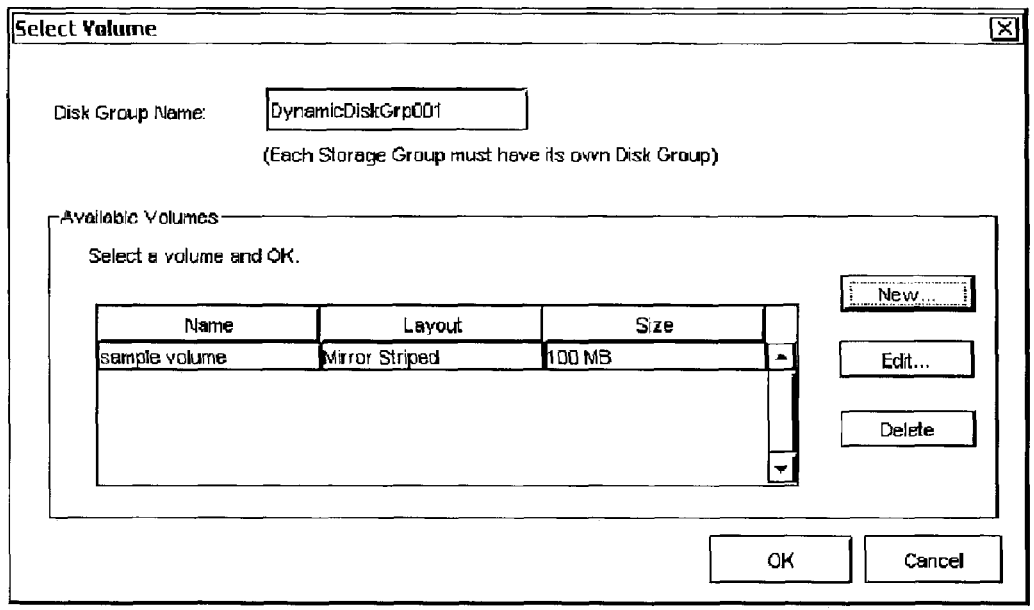
Figure 15K:
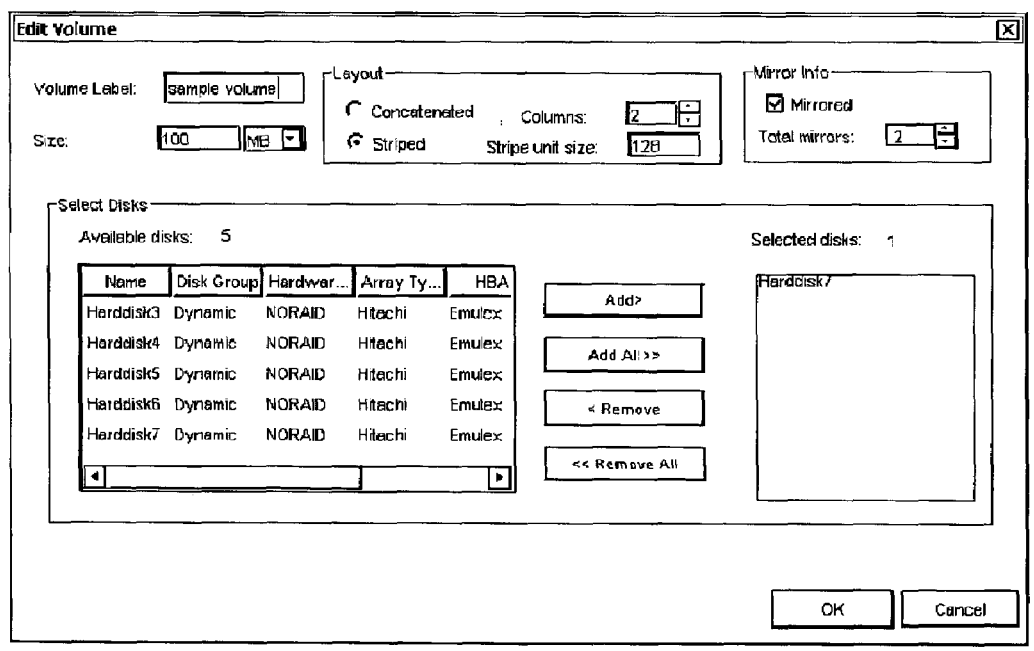
Figure 15L:
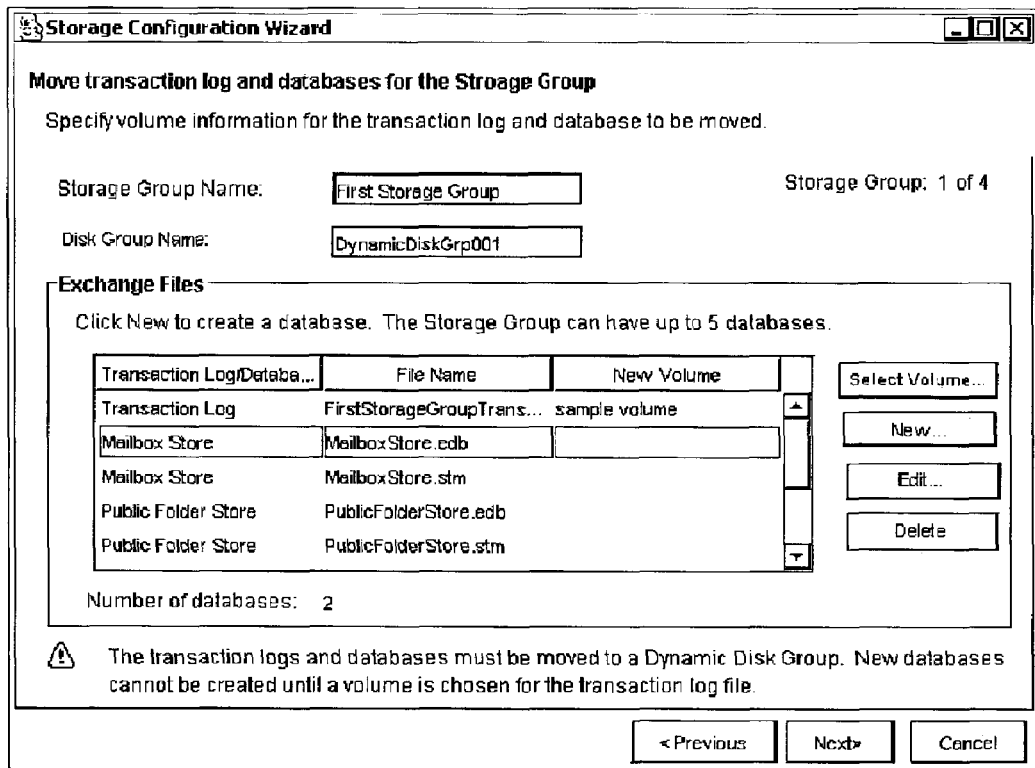
Figure 15M:
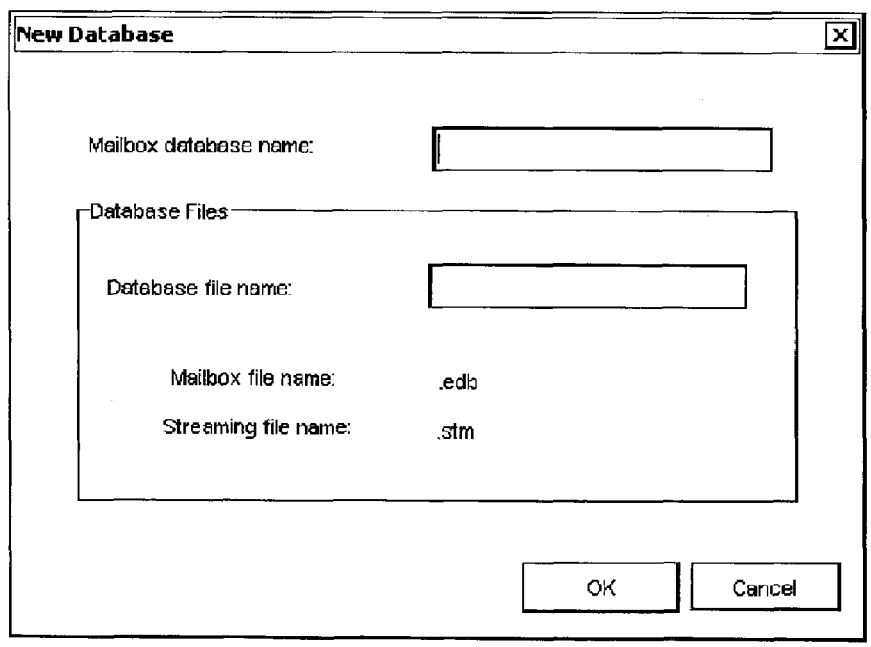
Figure 15N:
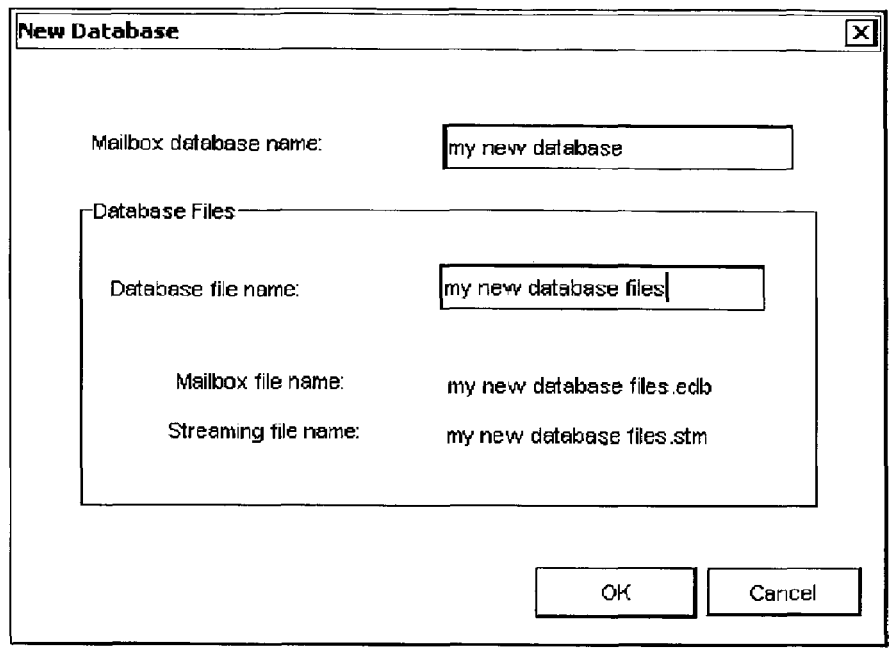
Figure 15O:
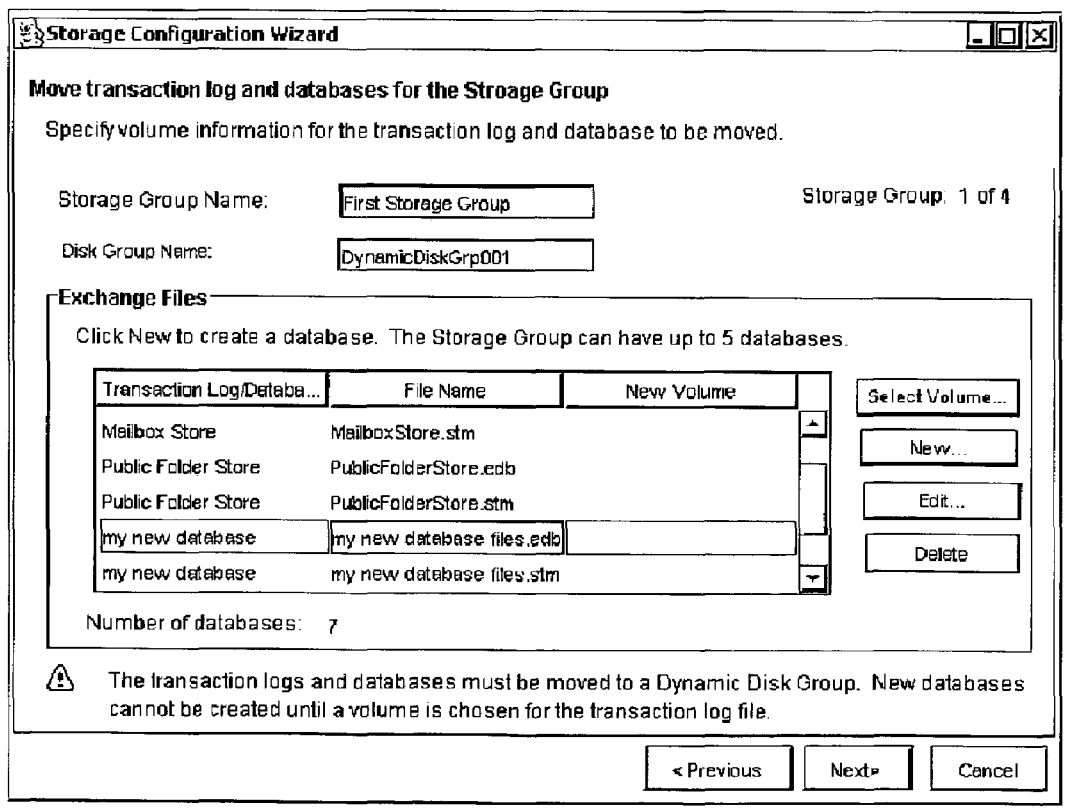
Figure 15P:
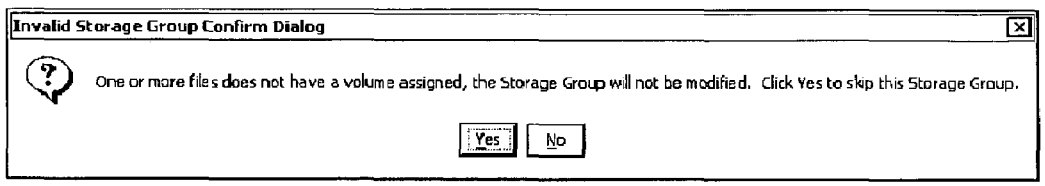
Figure 15Q:
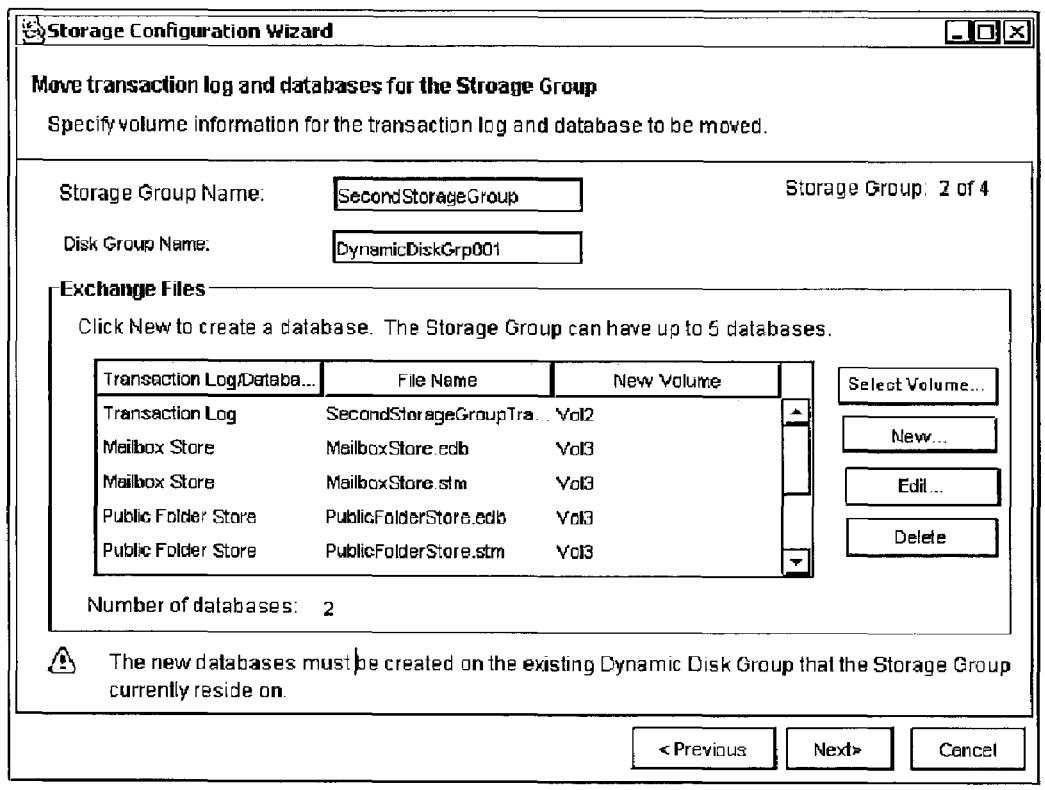
Figure 15R:
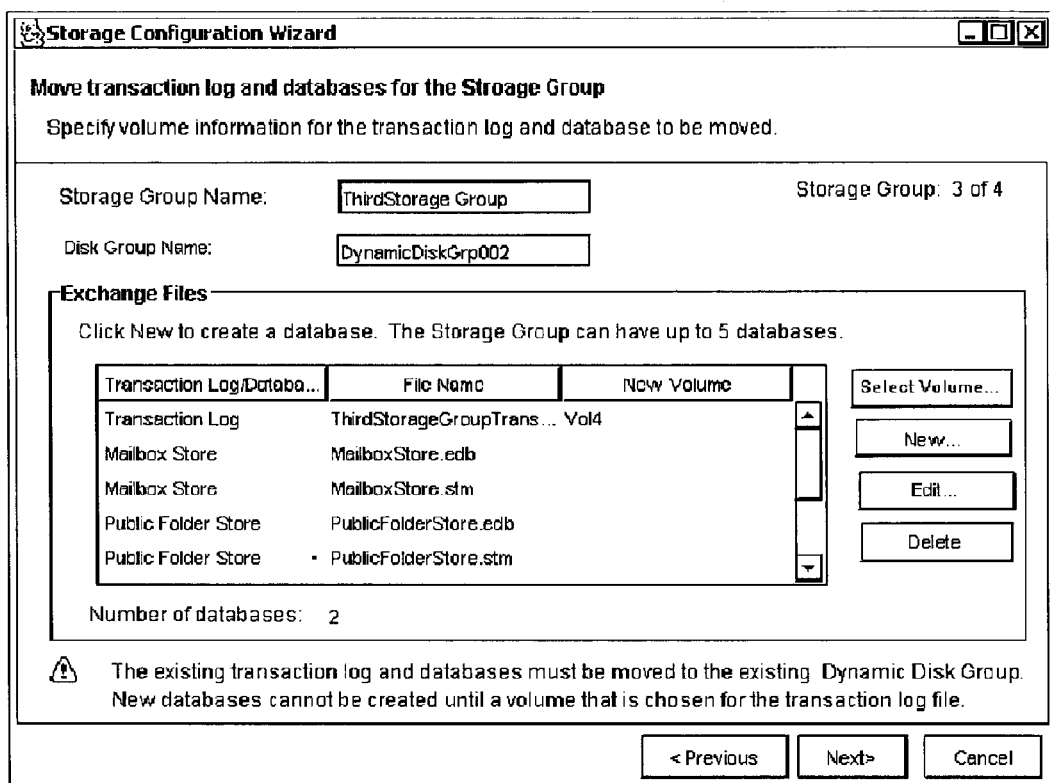
Figure 15S:
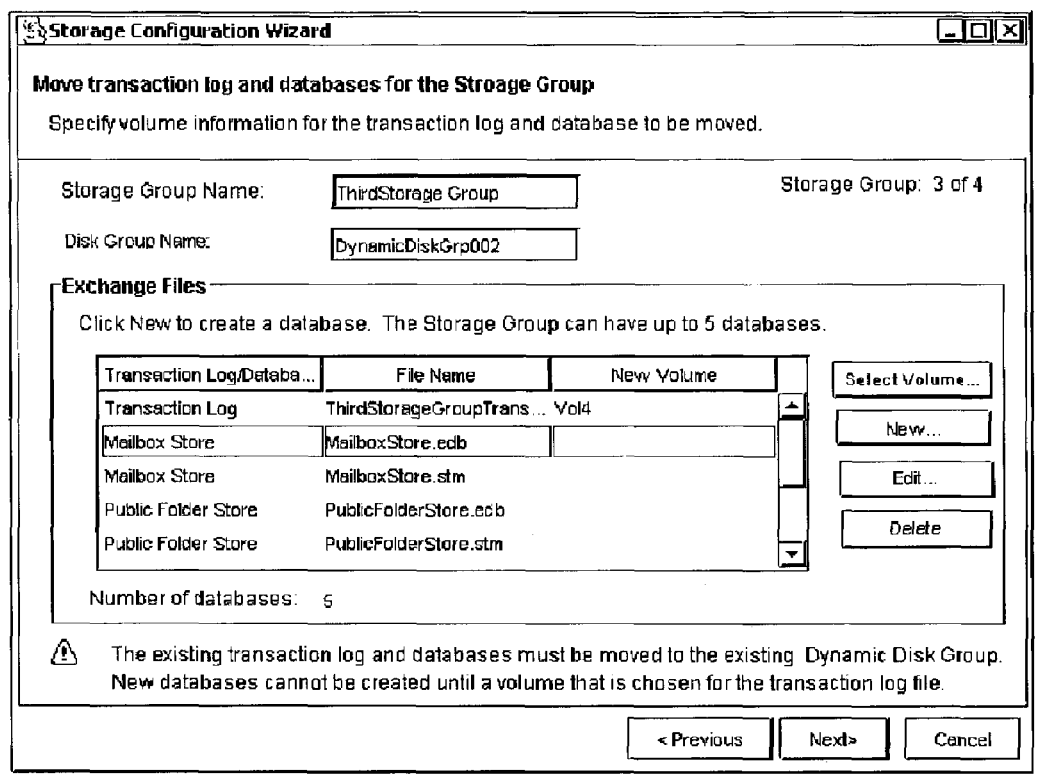
Figure 15T:
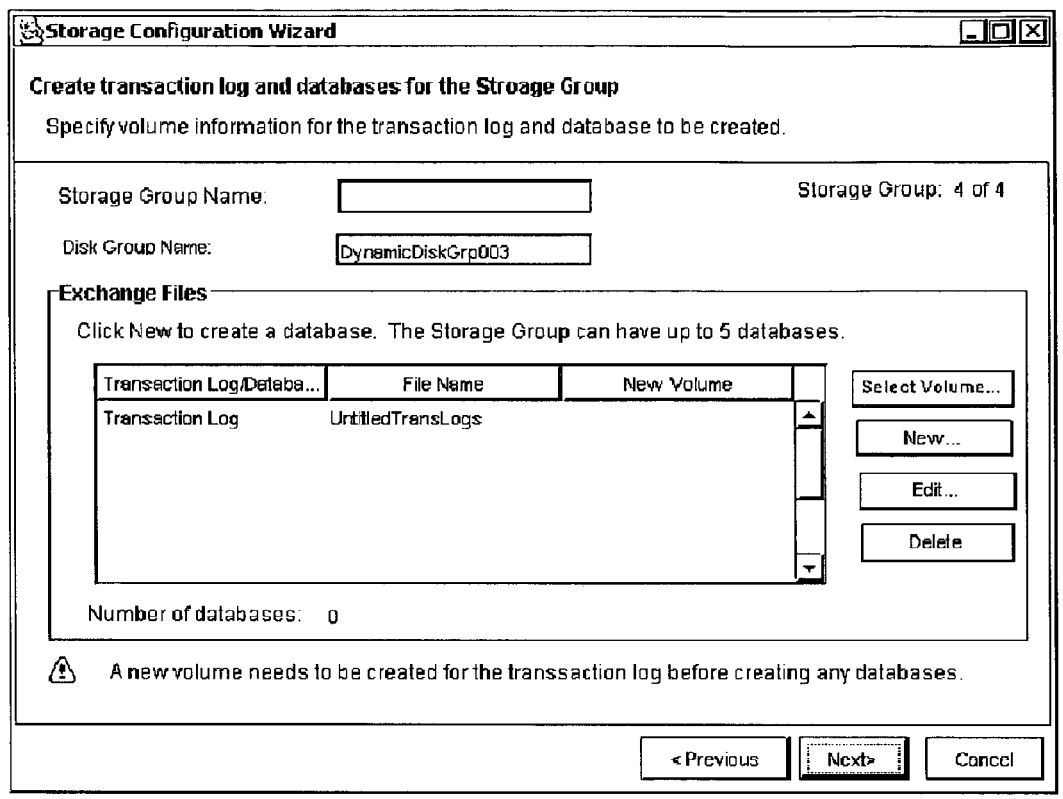
Figure 15U:
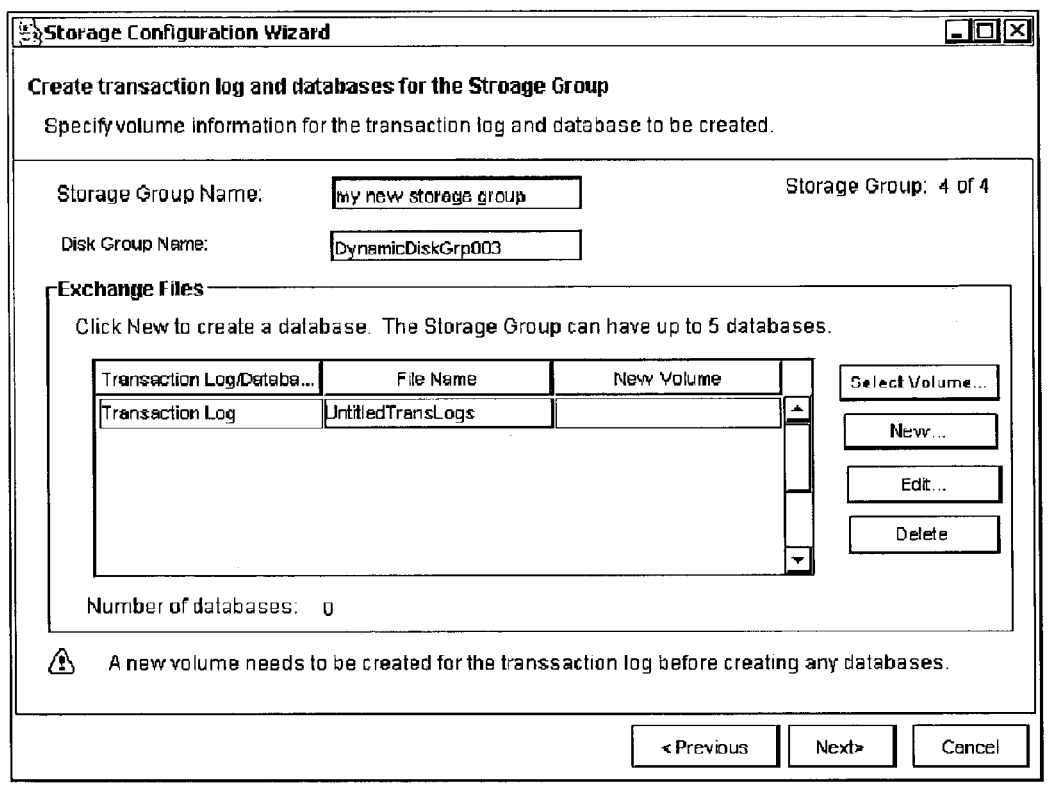
Figure 15V:
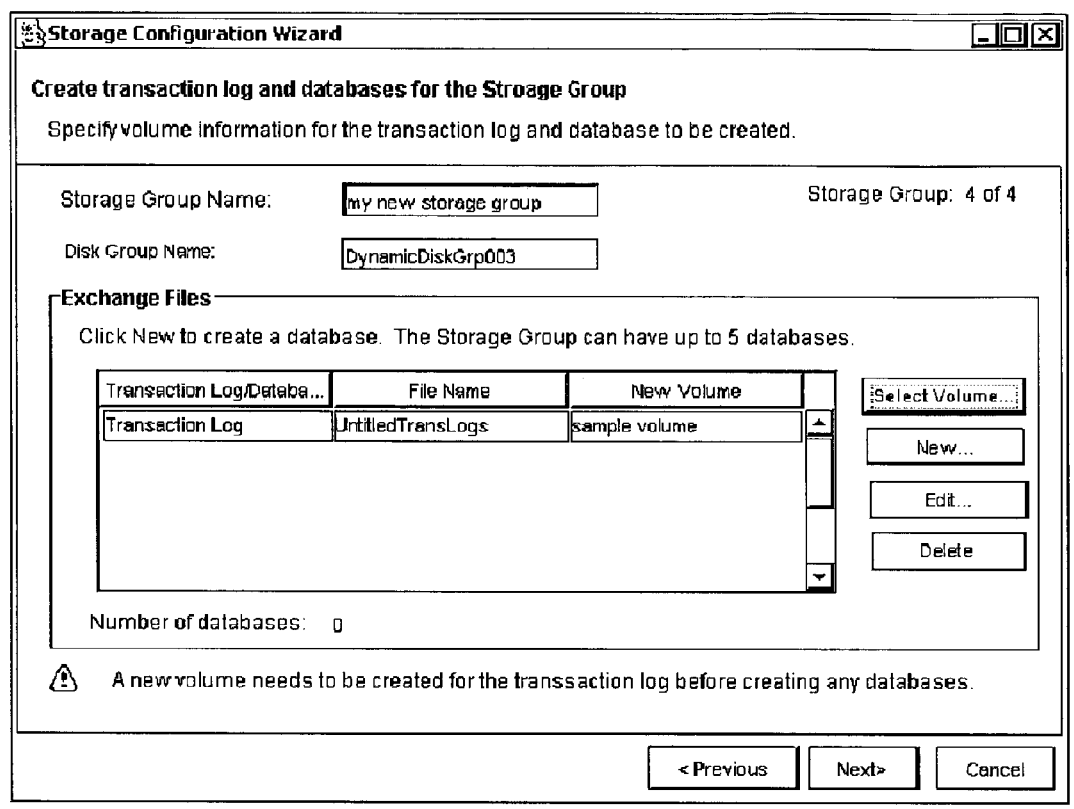
Figure 15W:
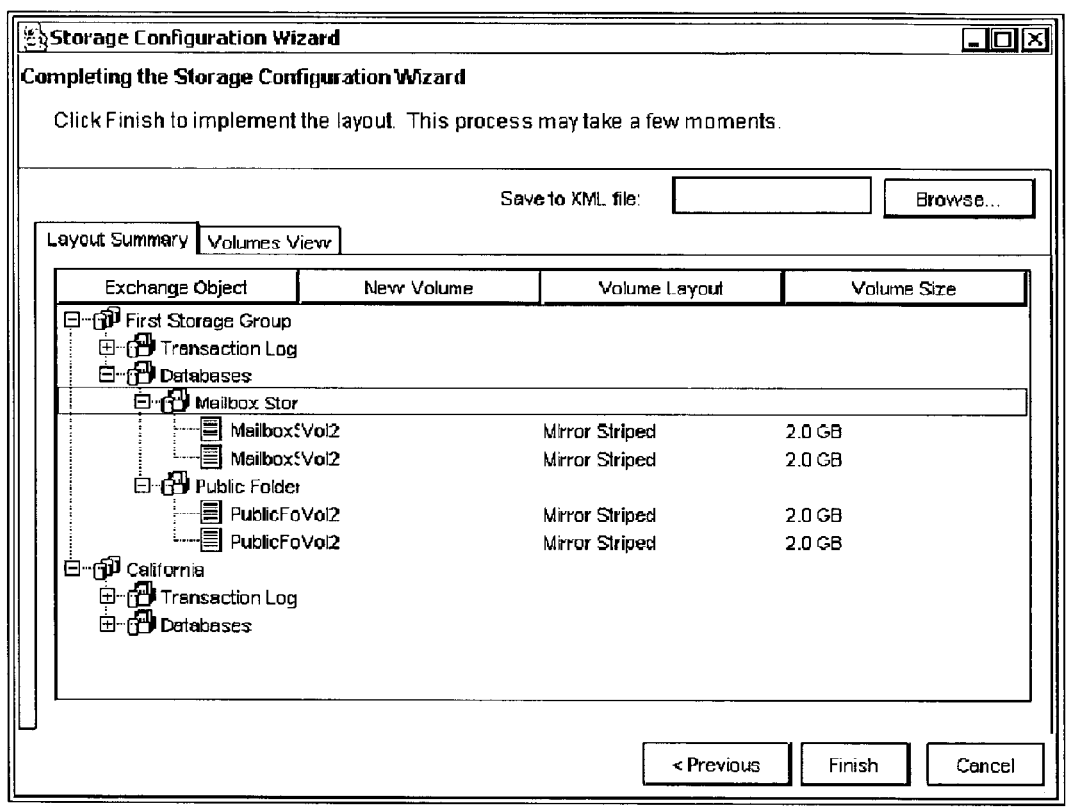
Figure 15X:
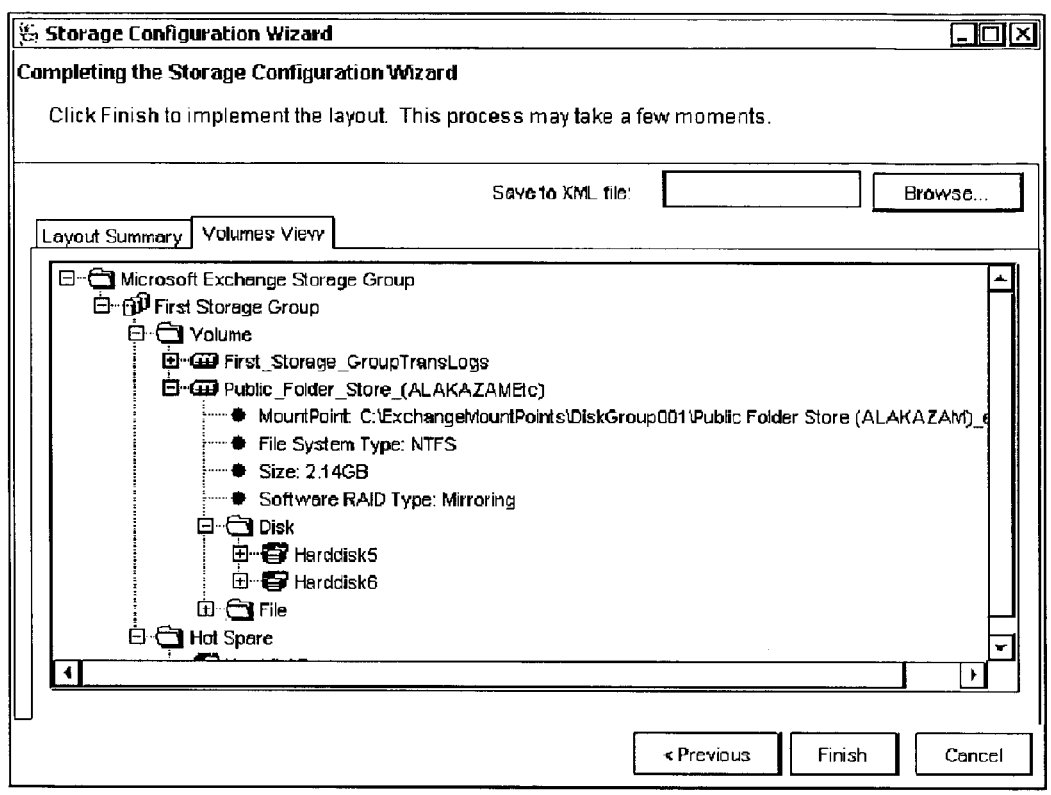

FIGS. 15A–X are screen shots of a storage configuration wizard according to one embodiment. These screen shots describe operation when the user selects the "custom mode" in FIG. 15B (or 14B). The "custom mode" version guides the user through the process of building his/her own "suggestedLayout".

In one embodiment, the GUI described in FIGS. 15A–X allows the user to modify existing layouts. This embodiment may be implemented by using the same format as the "custom mode" wizard in FIGS. 15A–X, but by pre-populating the wizard with information from the SuggestedLayout.xml file to be modified. The method preferably performs validation between all the pages of these wizards as well.

Clustering and Replication Embodiments

One embodiment of the invention provides configuration support for clustering (e.g., like Microsoft Cluster Service and VERITAS Cluster Service) and replication (VERITAS Volume Replicator) as well. In this embodiment, the "storage configurator" allows the user to select which servers on the network the user desires to replicate. Then the "storage configurator" gathers available disk information from all of the servers. The following example assumes replication of data from 3 sites (or 3 servers) around the world, these being NY, Seattle, and Tokyo). The user may then select the servers to configure for replication in the first page of the wizard, then select the desired storage to use for each server on the next 3 pages, and then proceed through the rest of the wizard in FIG. 15 as shown. At the end of the wizard, the storage configurator would produce 3 layouts, one for each server. The details of the volume layouts on each server may be different on each machine—depending on the storage available, but the volume names, sizes, disk group's names, and application's data objects names and volumes will all be the same. The user could then choose to implement the layouts on each server. As a result, this embodiment operates to automatically configure clustering and/or replication.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for determining a storage configuration of a storage system for an application, the method comprising:
   determining existing storage capabilities in the storage system;
   receiving information regarding the application;
   automatically determining a storage configuration for the storage system based on the existing storage capabilities in the storage system and the information regarding the application, wherein said automatically determining a storage configuration comprises:
      examining a first data structure comprising rule information;
      performing pattern matching between the information regarding the application and the rule information;
      creating a second data structure comprising storage organization information of the storage configuration based on said pattern matching, wherein the second data structure is used in determining the storage configuration; and
   storing the storage configuration, wherein the storage configuration is useable in configuring the storage system.

2. The method of claim 1,
   wherein said automatically determining a storage configuration comprises:
      examining available storage in the storage system;
      determining storage allocations based on the available storage in the storage system and the second data structure comprising storage organization information of the storage configuration; and
      generating the storage configuration based on said determining.

3. The method of claim 1,
   wherein the second data structure comprises information regarding which application objects should be in which storage subsets.

4. The method of claim 1,
   wherein said automatically determining a storage configuration further comprises:
      determining two or more groupings of application objects;
   wherein said automatically determining a storage configuration uses two or more of the first data structure, the second data structure, and the two or more groupings of application objects.

5. The method of claim 4,
   wherein said automatically determining a storage configuration comprises:
      examining available storage in the storage system;
      determining storage allocations based on the available storage in the storage system, the two or more groupings of application objects, and the second data structure comprising storage organization information, wherein said determining uses an allocation algorithm; and
      generating the storage configuration based on said determining.

6. The method of claim 1, wherein the storage system comprises a plurality of storage devices coupled together over a network.

7. A memory medium comprising program instructions executable to implement the method of:
   determining existing storage capabilities in the storage system;
   receiving information regarding the application;
   automatically determining a storage configuration for the storage system based on the existing storage capabilities in the storage system and the information regarding the application, wherein said automatically determining a storage configuration comprises:
      examining a first data structure comprising rule information;
      performing pattern matching between the information regarding the application and the rule information;
      creating a second data structure comprising storage organization information of the storage configuration based on said pattern matching, wherein the second data structure is used in determining the storage configuration; and storing the storage configuration, wherein the storage configuration is useable in configuring the storage system.

8. The memory medium of claim 7, wherein said automatically determining a storage configuration comprises:

examining available storage in the storage system;

determining storage allocations based on the available storage in the storage system and the second data structure comprising storage organization information of the storage configuration; and generating the storage configuration based on said determining.

9. The memory medium of claim 7, wherein the second data structure comprises information regarding which application objects should be in which storage subsets.

10. The memory medium of claim 7, wherein said automatically determining a storage configuration further comprises:

determining two or more groupings of application objects;

wherein said automatically determining a storage configuration uses two or more of the first data structure, the second data structure, and the two or more groupings of application objects.

11. The memory medium of claim 10, wherein said automatically determining a storage configuration comprises:

examining available storage in the storage system;

determining storage allocations based on the available storage in the storage system, the two or more groupings of application objects, and the second data structure comprising storage organization information, wherein said determining uses an allocation algorithm; and generating the storage configuration based on said determining.

12. The memory medium of claim 7, wherein the storage system comprises a plurality of storage devices coupled together over a network.

* * * * *

UNITED STATES PATENT AND TRADEMARK OFFICE
CERTIFICATE OF CORRECTION

| | | |
|---|---|---|
| PATENT NO. | : 7,043,619 B1 | Page 1 of 1 |
| APPLICATION NO. | : 10/327561 | |
| DATED | : May 9, 2006 | |
| INVENTOR(S) | : Knight et al. | |

It is certified that error appears in the above-identified patent and that said Letters Patent is hereby corrected as shown below:

On the title page, item [75]:

The Inventors should be -- Margaret E. Knight, Seattle, WA (US)
    Ron S. Vogel, San Jose, CA (US). --

Signed and Sealed this

Twenty-second Day of August, 2006

JON W. DUDAS
*Director of the United States Patent and Trademark Office*